(12) United States Patent
Wagoner

(10) Patent No.: US 7,847,507 B2
(45) Date of Patent: Dec. 7, 2010

(54) ZERO-CURRENT NOTCH WAVEFORM FOR CONTROL OF A THREE-PHASE, WYE-CONNECTED H-BRIDGE CONVERTER FOR POWERING A HIGH-SPEED ELECTRIC MOTOR

(75) Inventor: Robert G. Wagoner, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 572 days.

(21) Appl. No.: 11/809,122

(22) Filed: May 31, 2007

(65) Prior Publication Data

US 2008/0298098 A1 Dec. 4, 2008

(51) Int. Cl.
*G05B 11/28* (2006.01)

(52) U.S. Cl. .................. 318/599; 318/779; 318/799; 318/800; 363/41; 363/42; 363/56.02

(58) Field of Classification Search .................. 318/293, 318/400.29, 400.35, 599, 722, 779, 799, 318/800, 801, 430, 432, 434; 363/34, 40, 363/42, 56.02, 57, 58, 132, 21.03, 21.1, 21.11, 363/41, 65, 71

See application file for complete search history.

(56) References Cited

U.S. PATENT DOCUMENTS

| | | | | |
|---|---|---|---|---|
| 4,050,006 A | * | 9/1977 | Stich | 363/98 |
| 4,052,658 A | * | 10/1977 | Hucker | 363/43 |
| 4,245,290 A | * | 1/1981 | Lipman | 363/41 |
| 4,458,194 A | * | 7/1984 | Geppert et al. | 318/811 |
| 4,587,474 A | * | 5/1986 | Espelage et al. | 318/709 |
| 4,763,059 A | * | 8/1988 | Espelage et al. | 318/811 |
| 5,168,437 A | * | 12/1992 | Gyugyi et al. | 363/42 |
| 5,212,629 A | * | 5/1993 | Jessee | 363/42 |
| 5,430,362 A | * | 7/1995 | Carr et al. | 318/779 |
| 5,515,264 A | * | 5/1996 | Stacey | 363/132 |
| 5,548,197 A | * | 8/1996 | Unsworth et al. | 318/757 |
| 5,917,295 A | * | 6/1999 | Mongeau | 318/400.29 |
| 6,051,952 A | * | 4/2000 | Moreira et al. | 318/738 |
| 6,278,623 B1 | * | 8/2001 | Garces et al. | 363/46 |
| 6,803,741 B2 | * | 10/2004 | Messersmith | 318/729 |

OTHER PUBLICATIONS

Mohan/Undeland/Robbins, Power Electronics, 1995,John Wiley & Sons, Inc, 2nd Edition, pp. 240-241 and 150-153.*

* cited by examiner

*Primary Examiner*—Bentsu Ro
*Assistant Examiner*—Antony M Paul
(74) *Attorney, Agent, or Firm*—Edward J. Smith; Ernest G. Cusick; Frank A. Landgraff

(57) ABSTRACT

A zero-current, synchronous switching waveform is provided for a three-phase, wye-connected H-Bridge to power an electric motor. The switching waveform includes two notches per cycle on the switching waveform provided to each of the semiconductor switches to minimize total harmonic distortion and switching loss. Positioning of the notch with respect to the zero-current crossing is optimized to reduce switching loss and minimize total harmonic distortion.

1 Claim, 14 Drawing Sheets

ZERO-CURRENT NOTCH WAVEFORM FOR CONTROL OF A THREE-PHASE, WYE-CONNECTED H-BRIDGE CONVERTER FOR POWERING A HIGH-SPEED ELECTRIC MOTOR

BACKGROUND OF THE INVENTION

The present invention is related to applications assigned to the General Electric Co. and presently issued as U.S. Pat. No. 7,643,318 dated Jan. 5, 2010 and U.S. Pat. No. 7,643,319 dated Jan. 5, 2010 by Robert G. Wagoner.

The invention relates generally to gating signals for a three-phase, wye-connected H-bridge converter and more particularly to a zero-current notch waveform gating signal for minimizing harmonic distortion of the output waveform and increasing power output of the converter.

High-speed, high-power electric motors that operate at variable speed are increasingly required in a range of industrial, mining and drilling activities. Further, the activities often require a high-degree of reliability. In operations such as crude oil pumping from remote global locations where access to pumping stations is difficult and time-consuming, reliability of motor operation is necessary to prevent dangerous, costly and extended outages. Simple, sturdy and reliable power converters are requisites for such high-speed, high-power motor operations. It is well known that providing multiple individual components, such as series or parallel semiconductor switches, may increase the likelihood that any one individual component switch may randomly fail. Added elements such as snubber circuits for semiconductor switches, further increases the number of components that can fail. It is desirable to arrange the power converter in a simple configuration, with as low a part component count as is possible. However, individual components such as the semiconductor switches for the power converted must be operated with satisfactory margin to thermal and other functional limits to prevent failures in the simplified configuration.

A simplified three-phase, wye-connected H-bridge converter configuration is illustrated in FIG. 1. Each phase of the converter includes a power source/sink 20 with a dc power shaping circuit, represented by capacitor 30. The power source/sink/20 and dc power shaping circuit, represented by capacitor 30, establish a dc-link voltage input to the semiconductor switches of the bridge. Insulated-gate bipolar transistors (IGBTs) 40 with built-in diodes 45 may form each leg of the H-bridges 50, for example, but other power semiconductor switches such as integrated-gate commutated thyristors (IGCTs) or metal-oxide semiconductor field-effect transistors (MOSFETs) could be used instead. The type of power semiconductor switch is not important to the analysis. Each H-bridge includes two legs, an output leg 60 and a neutral leg 65. Each phase output, phase A 70, phase B 75 and phase C 80 is connected to the midpoint 85 of the respective output bridge leg 60. Each neutral connection to wye-point 90 is tied to the midpoint 95 of the respective neutral output leg 65. Output phase A 70, output phase B 75, and output phase C 80 are connected to motor 90. The output or line current of the respective H-Bridge phase forms the respective load current Ia 91, Ib 92 and Ic 93 for the load motor 90.

Gating controls 35 provide control signals 36, 37, 38 for switching semiconductor switches 40 of Phases A, B, and C of the H-bridge converter, according to predetermined switching patterns. Gating controls may provide for synchronous switching or asynchronous (pulse-width modulation, for example) switching of the semiconductors switches 40 of the H-bridge.

However, to assure availability of operation of the motor loads, it is desirable to further reduce switching losses and harmonic distortion. Reduction in switching loss will keep semiconductor H-bridge switches operating at lower temperatures with a greater margin to failure. Accordingly, there is a need to provide a gating control scheme to further reduce switching loss and to minimize harmonic distortion.

BRIEF DESCRIPTION OF THE INVENTION

It would be desirable to provide gating signals that position notches at current zero crossings to minimize switching loss and maximize bridge output power capability and at the same time to provide voltage and current harmonics that are lower than other prior art switching waveforms.

Briefly in accordance with one aspect of the present invention, a method is provided for gating a three-phase wye-connected H-bridge converter for powering a high-speed electric motor to minimize switching loss and harmonic distortion. The method includes gating semiconductor switches of the H-bridge according to a zero current switching pattern with two notches. Notches are positioned in electrical proximity to a zero-current crossing for the motor load current.

In accordance with a second aspect of the present invention, a three-phase converter for powering a high-speed electric motor is provided. The converter includes a three-phase wye connected H-bridge formed with semiconductor switching devices and a phase output line from a midpoint of a first leg of the phase of the H-bridge. A neutral connection is provided from a midpoint of a second leg of the phase of the H-bridge. An ac power source provides an isolated dc link to each input phase of the three-phase, wye-connected H-bridge. A gating control for the semiconductor switching devices of the H-bridge is provided, wherein the gating control including a zero current switching pattern with two notches.

According to another aspect of the present invention, a method is provided for a control scheme for operating a high-speed electric motor powered from a three-phase wye-connected H-bridge converter with semiconductor switching devices to minimize switching loss and harmonic distortion, the control scheme comprising: providing gating control including a zero current switching pattern with two notches, wherein the control scheme for the semiconductor switching devices of the H-bridge is employed over at least a partial range of motor speed operation.

According to a further aspect of the present invention, a multi-phase converter for powering an electric motor is provided. The multi-phase converter includes a multi-phase bridge converter formed with semiconductor switching devices. A phase output line from a midpoint each leg of the phase of the multi-phase converter bridge is provided. An ac power source supplies a dc link. The dc-link feeds to each input leg of the multi-phase converter bridge. A gating control for the semiconductor switching devices of the multi-phase converter bridge provides gating control, including a zero current switching pattern with two notches.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including providing zero-current notch switching waveforms for large high-speed ac motors that provide current and voltage harmonics that are lower than prior art switching waveforms, while at the same time minimizing switching loss, thereby maximizing bridge output power capability.

The power factor of the motor determines the relationship between the converter output voltage and the load current. The notch position can be optimized to minimize switching loss by adjusting its position based on the particular power factor of the specific motor.

While the exemplary embodiments for the present invention describe an application to a 6 MW, high-speed electric motor that may operate at about 17,000 RPM, the invention is not limited to high-speed ac motors, but includes application to all ac motors.

Figure 2A:
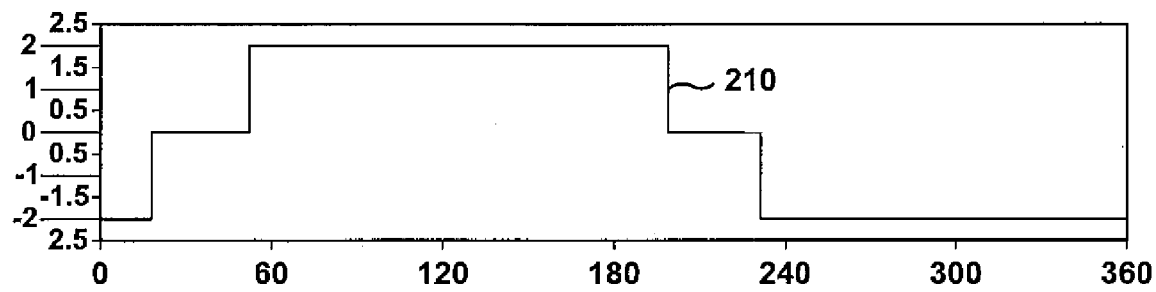
FIG. 2A illustrates stepped output voltage of a single H-bridge between leg midpoints.
Figure 2B:
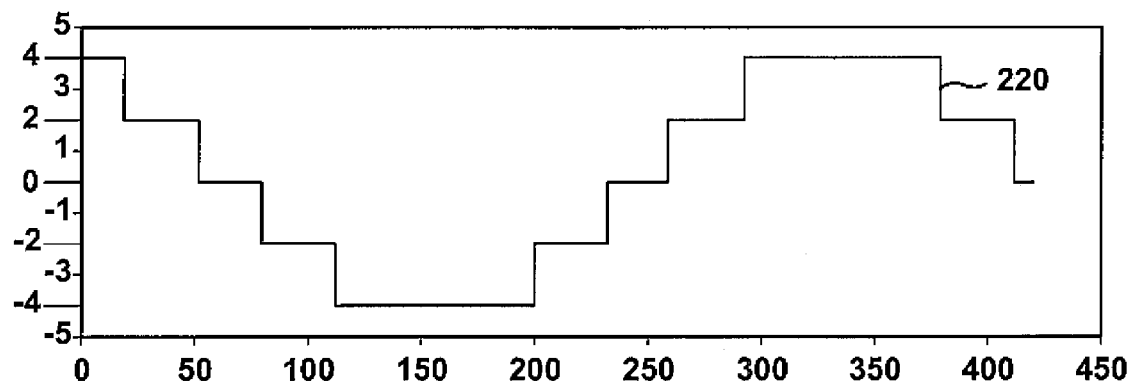
FIG. 2B illustrates stepped output line-to-line voltage of two series H-bridges.

Several fundamental synchronous switching schemes for the three-phase wye-connected H-bridge converter may be considered with respect to the operation of large motors. The switching schemes establish a fundamental voltage output frequency for driving the motor. The switching output 210 of one phase of the H-bridge (between the midpoints of the respective legs) may establish a positive step output, a negative step output and a zero-value output, known as a three-level output, as shown in FIG. 2A. However in the three-phase wye-connected configuration, the output line voltage 220 (for example phase A to phase B) will provide a five-level output due to the combination of steps from the H-bridge of phase A and the H-bridge of phase B, as illustrated in FIG. 2B. Higher number of levels of output voltage will more closely simulate a sinusoidal wave and reduce harmonic distortion to the motor.

Figure 3:
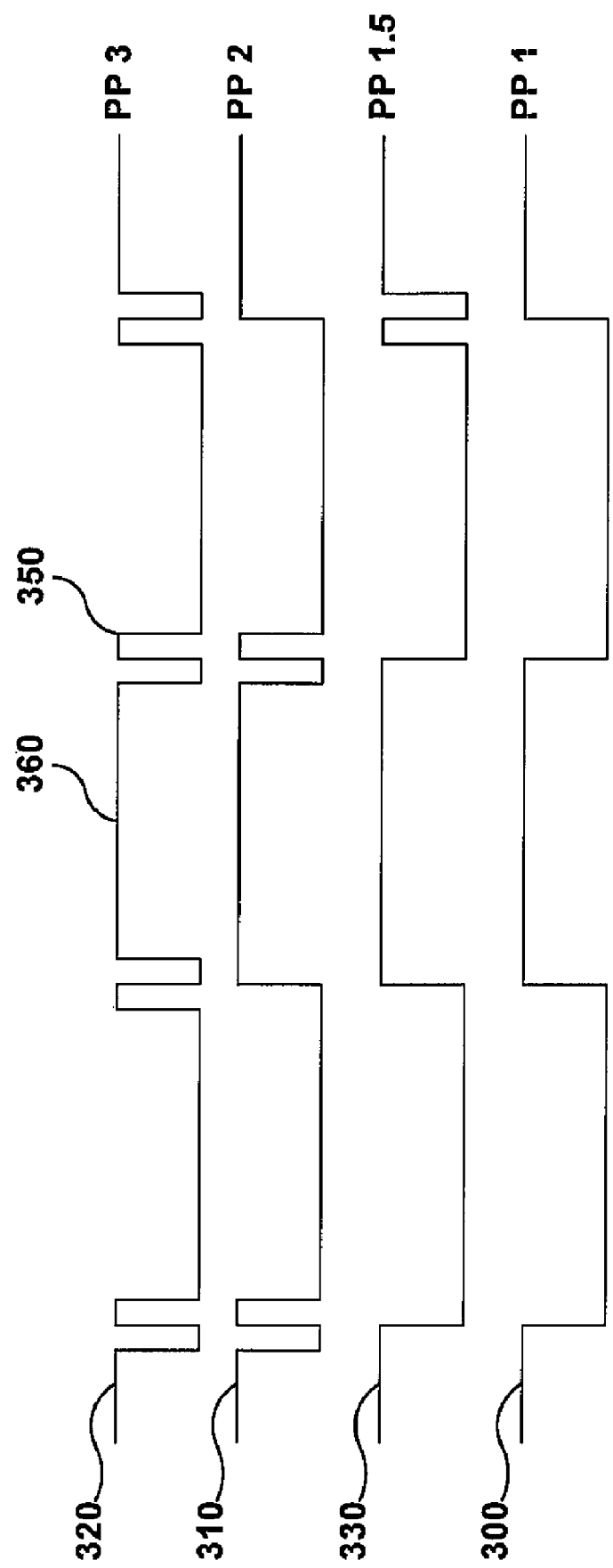
FIG. 3 illustrates four fixed pulse patterns (PP) with the same fundamental frequency for semiconductor device gating.

Four fixed pulse patterns with the same fundamental frequency are illustrated in FIG. 3. The fixed pulse patterns applied to the semiconductor switches of the individual H-bridges are 120 electrical degrees apart, resulting in the line output between phases (Phase A to Phase B for example) being 120 electrical degrees apart. Notches may be inserted around fundamental frequency pulses 360 of the pulse patterns to improve harmonic distortion performance. Insertion of notches 350 adds to the effective switching frequency of the bridge output. Pulse pattern 1 (PP1) 300 has an effective switching frequency of 1 times the fundamental frequency. Pulse pattern 2 (PP2) 310 has an effective switching frequency of 2 times the fundamental frequency. Pulse pattern 3 (PP3) 320 has an effective switching frequency of 3 times the fundamental frequency. Pulse pattern 1.5 (PP1) 340, with a notch applied in every other cycle, has an effective switching frequency of 1.5 times the fundamental frequency.

Higher switching rates due to the insertion of notches may incur higher switching losses on the semiconductor switches, putting the semiconductor switch closer to thermal margins and potentially impacting reliability of operation. PP1 has the lowest effective switching frequency and hence incurs the lowest switching loss in the semiconductor switches. However, PP1.5 presents the lowest harmonic distortion and at the same time, less switching loss than PP2 and PP3.

Figure 4A:
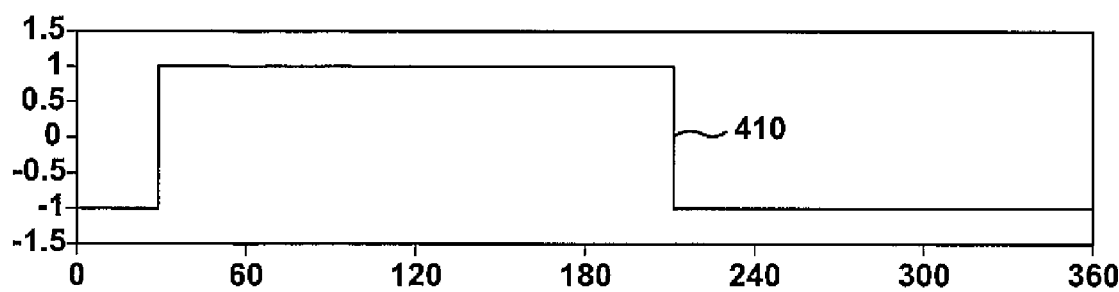
FIGS. 4A (5A, 6A, 7A) illustrates a waveform for one phase of a single phase H-bridge with a PP1 (PP2, PP3, PP1.5) input waveform.
Figure 4B:
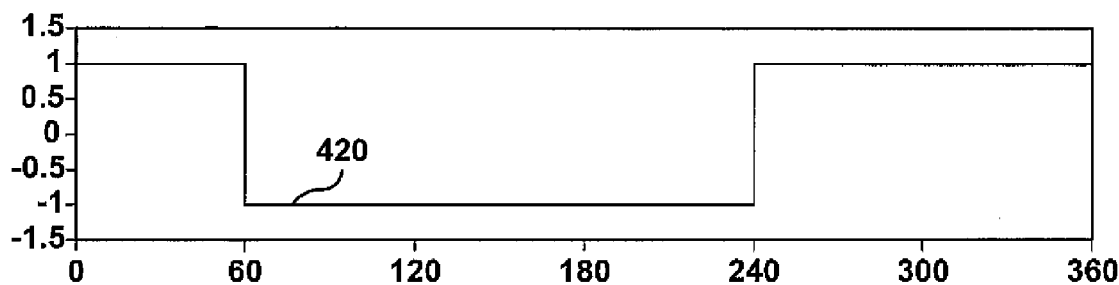
FIGS. 4B (5B, 6B, 7B) illustrates a waveform for a second phase of a single phase H-bridge with a PP1 (PP2, PP3, PP1.5) input waveform.
Figure 4C:
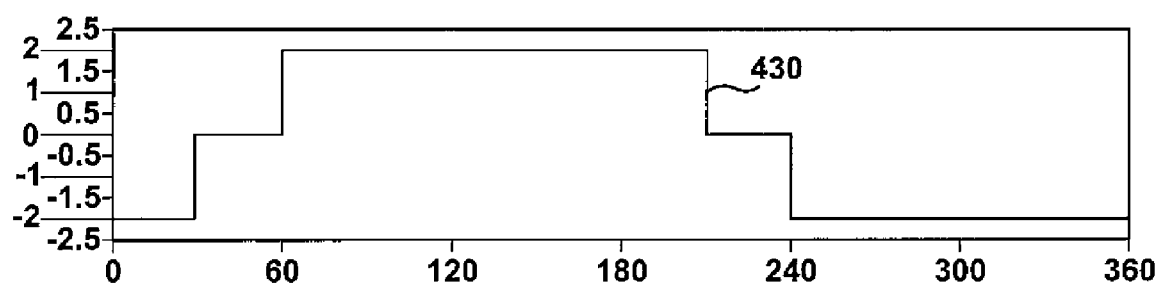
FIGS. 4C (5C, 6C, 7C) illustrates a waveform for a third phase of a single phase H-bridge with a PP1 (PP2, PP3, PP1.5) input waveform.
Figure 4D:
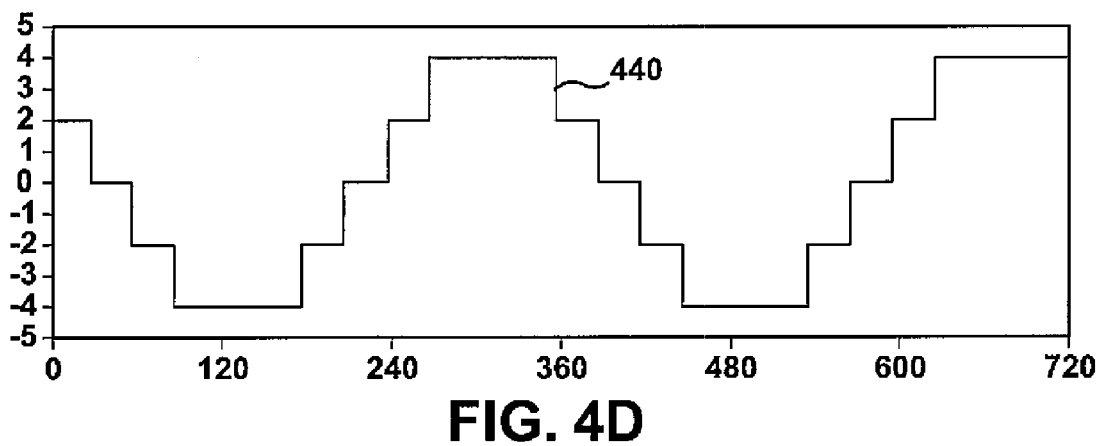
FIGS. 4D (5D, 6D, 7D) illustrates an output waveform (line-to-line) for a second phase of a single phase H-bridge with a PP1 (PP2, PP3, PP1.5) input waveform.
Figure 5A:
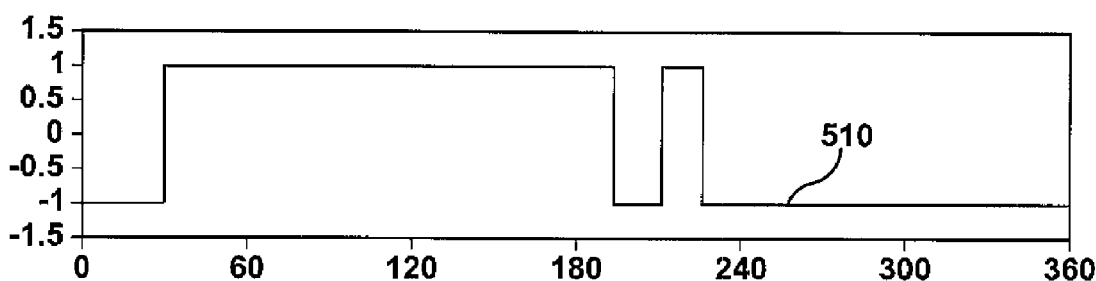
Figure 5B:
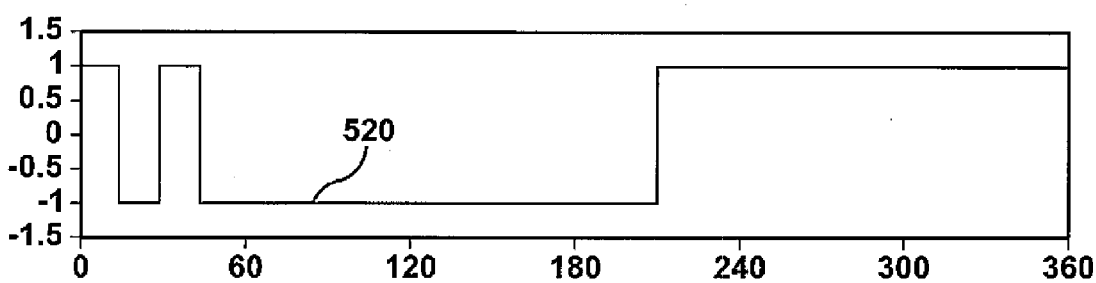
Figure 5C:
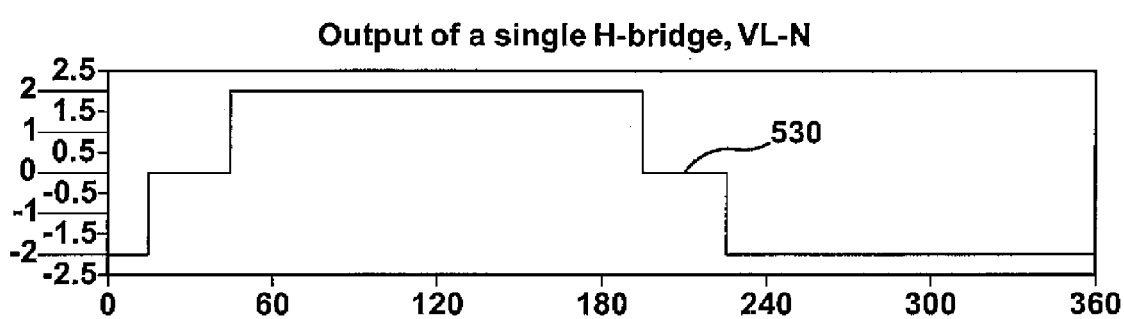
Figure 5D:
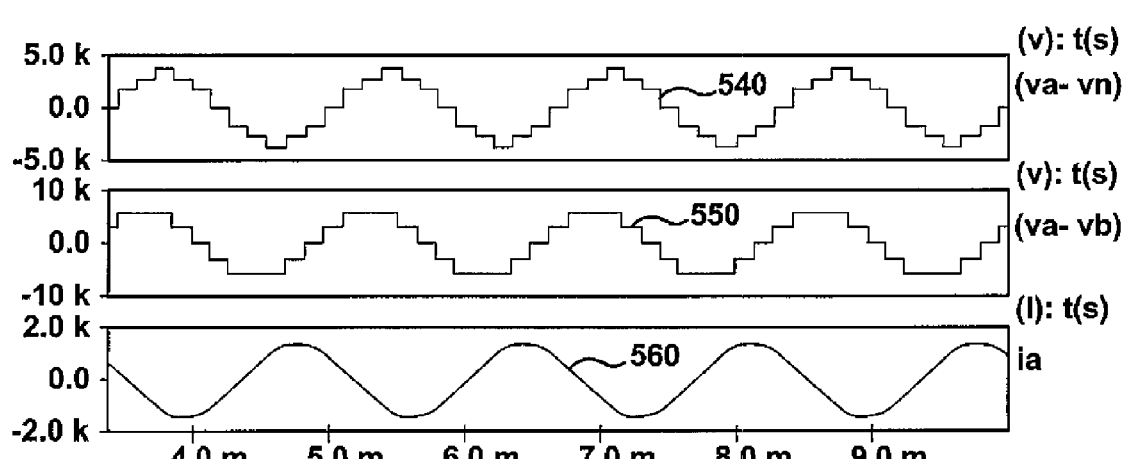
Figure 6A:
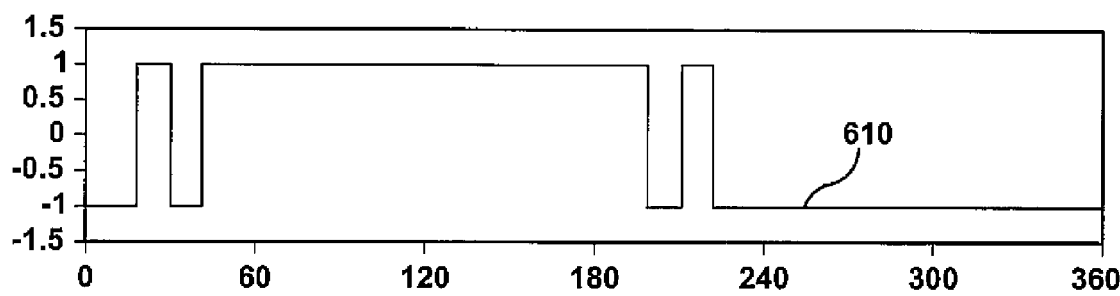
Figure 6B:
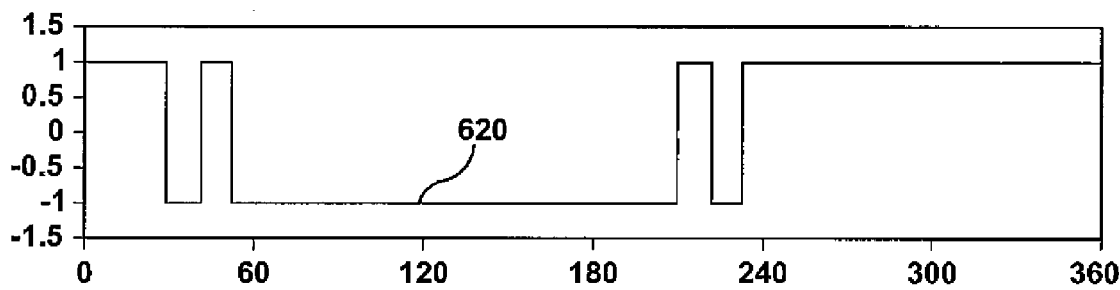
Figure 6C:
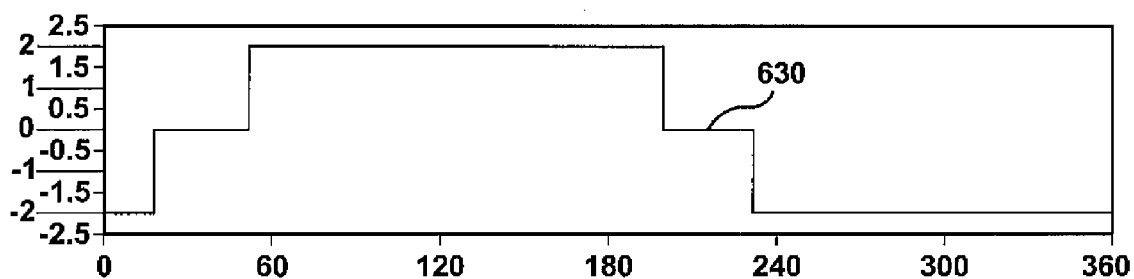
Figure 6D:
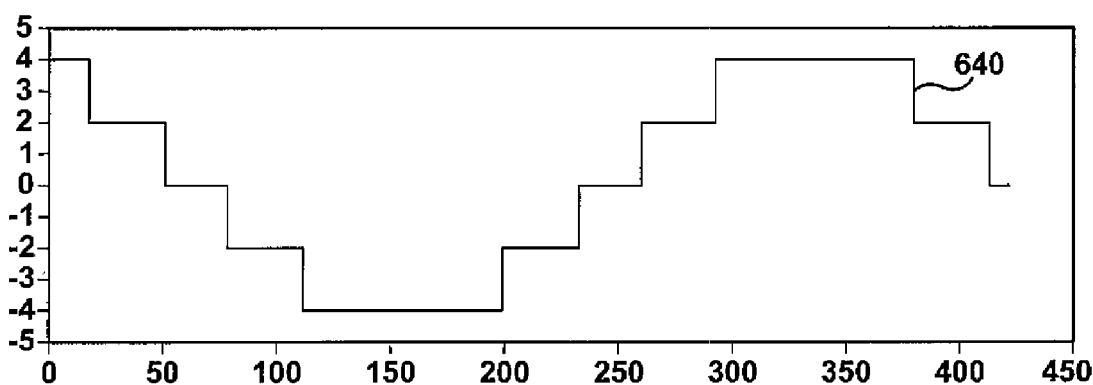
Figure 7A:
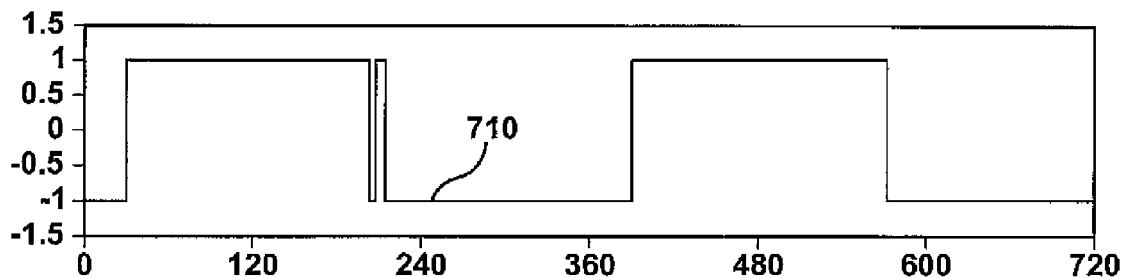
Figure 7B:
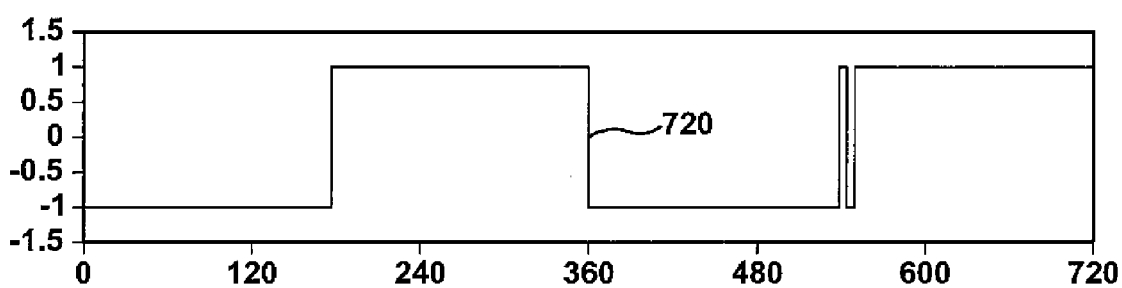
Figure 7C:
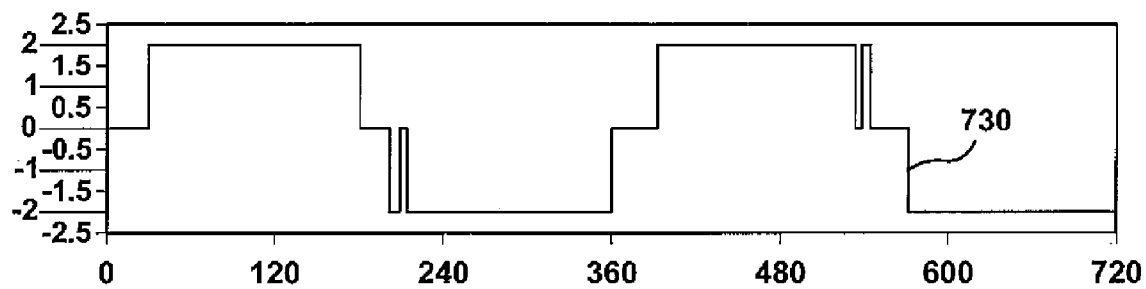
Figure 7D:
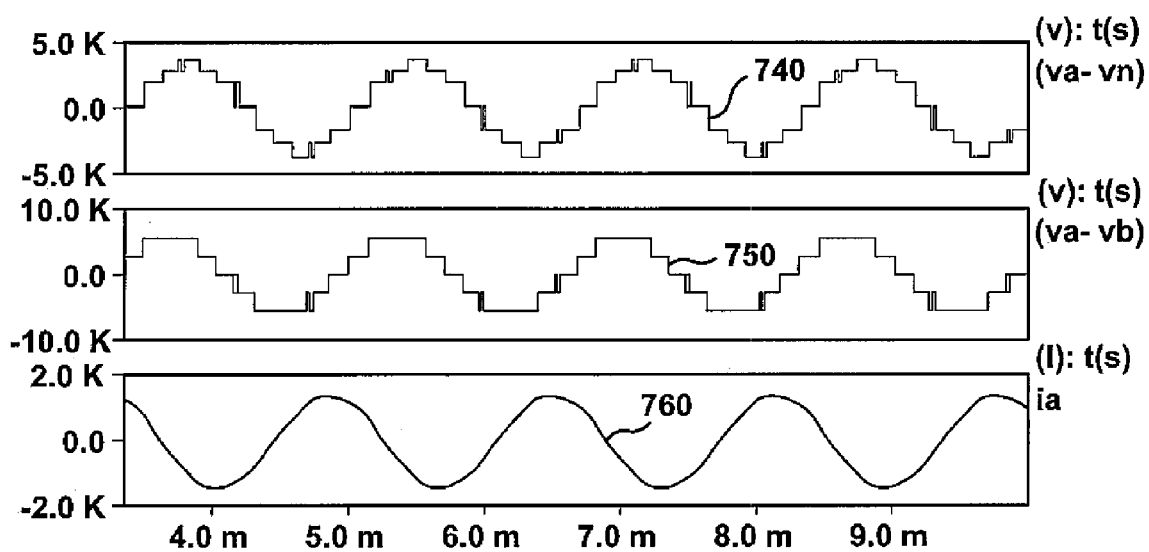

Further studies were conducted for PP1, PP2, PP3 and PP 1.5 for evaluation of the effect of phase shift between the two legs of the bridges, notch width and notch location. With zero phase shift between control waveforms for legs of each individual H-bridge, some of the control waveforms to different H-bridges may not be unique resulting in some of the switching events in connected H-bridges occurring simultaneously, thereby not generating extra pulses on the output. In the aforementioned converter utilizing PP2 control waveforms, the control signals will be unique, but some of the switching events happen simultaneously and in the same direction in the same H-bridge. Switching loss occurs in both of the legs of the H-bridge simultaneously and in the same direction, without benefit of a switching event being seen in the output waveform. It is, therefore, desirable to introduce phase shift on the control signals between the two legs of the individual H-bridge to allow the switching edges to create voltage changes on the output waveform. Shifting phase between legs of the bridge may shift the timing of output step changes and preserve higher-level output, thereby more closely simulating sinusoidal output performance and limiting distortion. FIG. 4A (5A, 6A, 7A) illustrates a waveform 410 (510, 610, 710) for one phase of a single-phase H-bridge with a PP1 (PP2, PP3, PP1.5) input waveform. FIG. 4B (5B, 6B, 7B) illustrates a waveform 420 (520, 620, 720) for a second phase of a single-phase H-bridge with a PP1 (PP2, PP3, PP1.5) input waveform. FIG. 4C (5C, 6C, 7C) illustrates an output voltage waveform 430 (530, 630, 730) for a third phase of a single phase H-bridge with a PP1 (PP2, PP3, PP1.5) input waveform. FIG. 4D (5D, 6D, 7D) illustrates a voltage output waveform 440 (540, 640, 740) (line-to-line) for a second phase of a single phase H-bridge with a PP1 (PP2, PP3, PP1.5) input waveform. FIG. 5D (7D) illustrates simulation results for converter output voltage (line-to-line) 550 (750) and phase A load current 560 (760).

Combinations of phase shift in the control signal, notch width selection and notch placement were modeled for the PP1, PP2, PP3 and PP1.5 control signals to determine optimum combinations for minimizing total harmonic distortion (THD). The PP1 input waveform incorporates a 30-degree phase shift between the bridges with no notch. The PP2 input waveform incorporates a 15-degree notch with no phase shift between bridges. The PP3 input waveform incorporates 10-degree notch with a 10-degree phase shift between bridges. The PP1.5 input waveform incorporates a 7-degree notch with a 30-degree phase shift between bridges. TABLE 1 summarizes the total harmonic distortion (THD) on load current for the input waveforms PP1, PP2, PP3, and PP1.5. A minimum THD on load current is provided by the PP1.5 control waveform.

TABLE 1

| Pulse Pattern | Switching Frequency | Min. THD (load current) |
|---|---|---|
| PP1 | Fundamental × 1 | 2.62% |
| PP2 | Fundamental × 2 | 2.62% |
| PP3 | Fundamental × 3 | 2.62% |
| PP1.5 | Fundamental × 1.5 | 2.49% |

Analysis was also performed to identify the effect of notch positioning on H-bridge output current capability. The repetitive nature of this fixed pulse pattern leads to a steady state power loss and temperature rise that is significantly different between the upper and lower semiconductors in the same leg of the H-bridge. At one extreme, the upper IGCTs have more switching loss than the lower IGCTs, and the lower diodes have more reverse recovery loss than the upper diodes. By moving the position of the notch, the switching losses may be reversed from the upper to the lower devices, however the significant differences remain between the upper and lower semiconductors in the same leg of the H-bridge. Alternate positioning of the notch within the same pulse pattern may maintain the same effective frequency, but may balance the temperatures more equally for the upper and lower semiconductors in the same leg of the individual H-bridge.

TABLE 2 illustrates the results on IGCT and diode power loss and temperature under cases of maximum stress of the upper IGCT/diode, maximum stress on the lower IGCT/diode and balance between the upper IGCT/diode and the lower IGCT/diode due to notch positioning with a PP1.5 waveform applied to a 6 Mw motor with a motor frequency of 600 Hz, a 0.8 lagging power factor, and a motor current of 815 A RMS, where the IGCT is an ABB 5 SHX 26LA510 with built in diode. Since there is an imbalance in semiconductor temperatures between the upper and lower device in a particular leg of the H-bridge, the power semiconductor with the highest temperature limits the current rating of the bridge. The modified PP1.5 pulse pattern maintains the same effective switching frequency as PP1.5 described above and can retain low harmonic distortion, but it balances the semiconductor temperatures better. The balancing of the temperature possible with the pulse pattern allows for higher output current in the bridge. In this particular example, the bridge output current is increased from 815 amps to 919 amps by utilizing the PP1.5 pattern with adjustment of notch placement.

TABLE 2

| Device | Parameter | Max. Load on Upper IGCT/Diode | | Max Load on Lower IGCT/Diode | | Balanced Load | |
|---|---|---|---|---|---|---|---|
| | | Upper IGCT/Diode | Lower IGCT/Diode | Upper IGCT/Diode | Lower IGCT/Diode | Upper IGCT/Diode | Lower IGCT/D Diode |
| IGCT | Hotspot Temp. | 62.95 C. | 63.84 C. | 63.84 C. | 62.95 C. | 63.39 C. | 63.39 C. |
| | Delta Temp. | 0.437 C. | 0.216 C. | 0.216 C. | 0.437 C. | 0.444 C. | 0.444 C. |
| | Ave. Temp. | 114.671 C. | 100.597 C. | 100.597 C. | 114.671 C. | 105.929 C. | 105.929 C. |
| | Max Temp. | 114.918 C. | 100.734 | 100.814 C. | 69.235 C. | 106.182 C. | 106.182 C. |
| Diode | Hotspot Temp. | 62.95 C. | 63.84 C. | 101.70 C. | 69.255 C. | 63.39 C. | 63.39 C. |
| | Delta Temp. | 0.040 C. | 0.519 C. | 0.519 C. | 0.040 C. | 0.531 C. | 0.531 C. |
| | Ave. Temp. | 69.235 C. | 100.814 | 100.814 C. | 69.235 C. | 84.939 C. | 84.939 C. |
| | Max Temp. | 69.255 C. | 101.070 | 101.070 C. | 69.255 C. | 85.201 C. | 85.201 C. |
| IGCT | On switching loss | 173.2 W | 0.0 W | 0.0 W | 173.2 W | 86.6 Q | 86.6 W |
| | Off switching loss | 2224.6 W | 1505.0 W | 1505.0 W | 2224.6 W | 1864.8 W | 1864.8 W |
| | Cond. loss | 649.6 W | 656.7 W | 656.7 W | 649.6 W | 653.1 W | 653.1 W |
| | Leakage loss | 21.8 W | 21.8 W | 21.8 W | 21.8 W | 21.8 W | 21.8 W |
| | Total loss | 3069.2 W | 2183.4 W | 2183.4 W | 3069.2 W | 2626.3 W | 2626.3 W |
| Diode | Rev. Recovery Loss | 0.0 W | 1002.5 W | 1002.5 W | 0.0 W | 501.2 W | 501.2 W |
| | Conduction loss | 186.9 W | 198.4 W | 198.4 W | 186.9 W | 192.7 W | 192.7 W |
| | Leakage Loss | 21.8 W | 21.8 W | 21.8 W | 21.8 W | 21.8 W | 21.8 W |
| | Total Loss | 208.7 W | 1222.7 W | 1222.7 W | 208.7 W | 715.7 W | 715.7 W |

TABLE 3 illustrates the relative capability of the three-phase, wye-connected H-bridge under the aforementioned switching schemes to accommodate higher output current. The PP1.5 pulse pattern provides not only the lowest THD of the original pulse patterns, but highest MVA output on the exemplary 6 MW HSEM. Further, while still maintaining the same notch width, but by relocating the notch position, the H-bridge with the PP1.5 switching pattern may provide an improved 6.28 MVA output compared to an original 5.38 MVA output, before relocation.

TABLE 3

| Pulse Pattern | Switching Frequency | Min. THD (current) | Max. Converter MVA |
|---|---|---|---|
| PP1 | Fundamental × 1 | 2.62% | 3.68 |
| PP2 | Fundamental × 2 | 2.62% | 5.08 |
| PP3 | Fundamental × 3 | 2.62% | 5.38 |
| PP1.5 | Fundamental × 1.5 | 2.49% | 6.28 |

Figure 10:
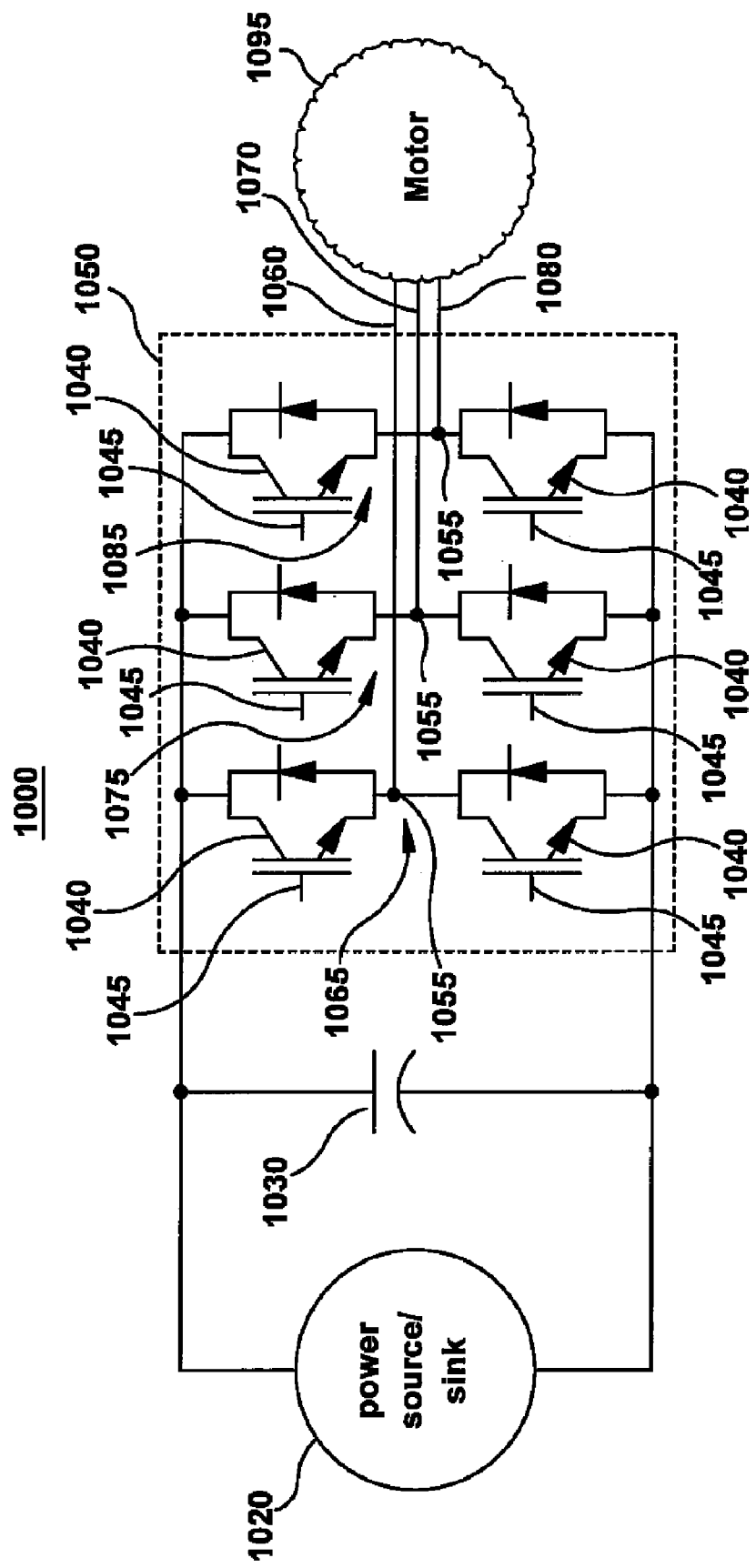
FIG. 10 illustrates a three-leg, three-phase converter bridge for driving a three-phase motor load.

According to one aspect of the present invention, a zero-current switching waveform is provided for the three-phase wye-connected H-bridge to power a large high-speed electric motor (HSEM). The switching waveform includes two notches per cycle on the switching waveform provided to each of the semiconductor switches. The switching waveform is referred to as a ZC (Zero Current) notch2 waveform. However, the ZCnotch2 waveform has application to a broader set of motor loads and is not restricted to the application of high-speed motors. Further, the ZCnotch2 waveform may be employed in other multi-phase semiconductor converter bridges, including three-phase bridge full converter circuits, as shown in FIG. 10.

According to the Zcnotch2 switching waveform, notches are placed at or near a load current zero crossing to minimize switching loss and maximize bridge output power capability. IGCT gate drive power is reduced due to the low gate charge for switching events at low current, thereby improving the reliability of IGCT gate drive circuit.

The ZCnotch2 switching waveform makes the effective switching frequency equal to two times the fundamental frequency. However, the semiconductor and gate drive power dissipation is still lower than the PP2 and PP3 input waveforms. The Zcnotch2 switching waveform may further be optimized to equalize power semiconductor losses between upper and lower devices in each leg of the H-bridge, thereby providing margin to operating limits, as previously described for the PP1.5 waveform in TABLE 2. Further, the ZCnotch2 switching waveform utilized in H-bridge, retains the property that the output voltage at the output of every H-bridge is symmetrical, eliminating even harmonics.

The switching signals for the bridge may be controlled by a microprocessor, an integrated circuit, a field programmable gate array (FPGA) or other electronic circuits known in the art.

Figure 1:
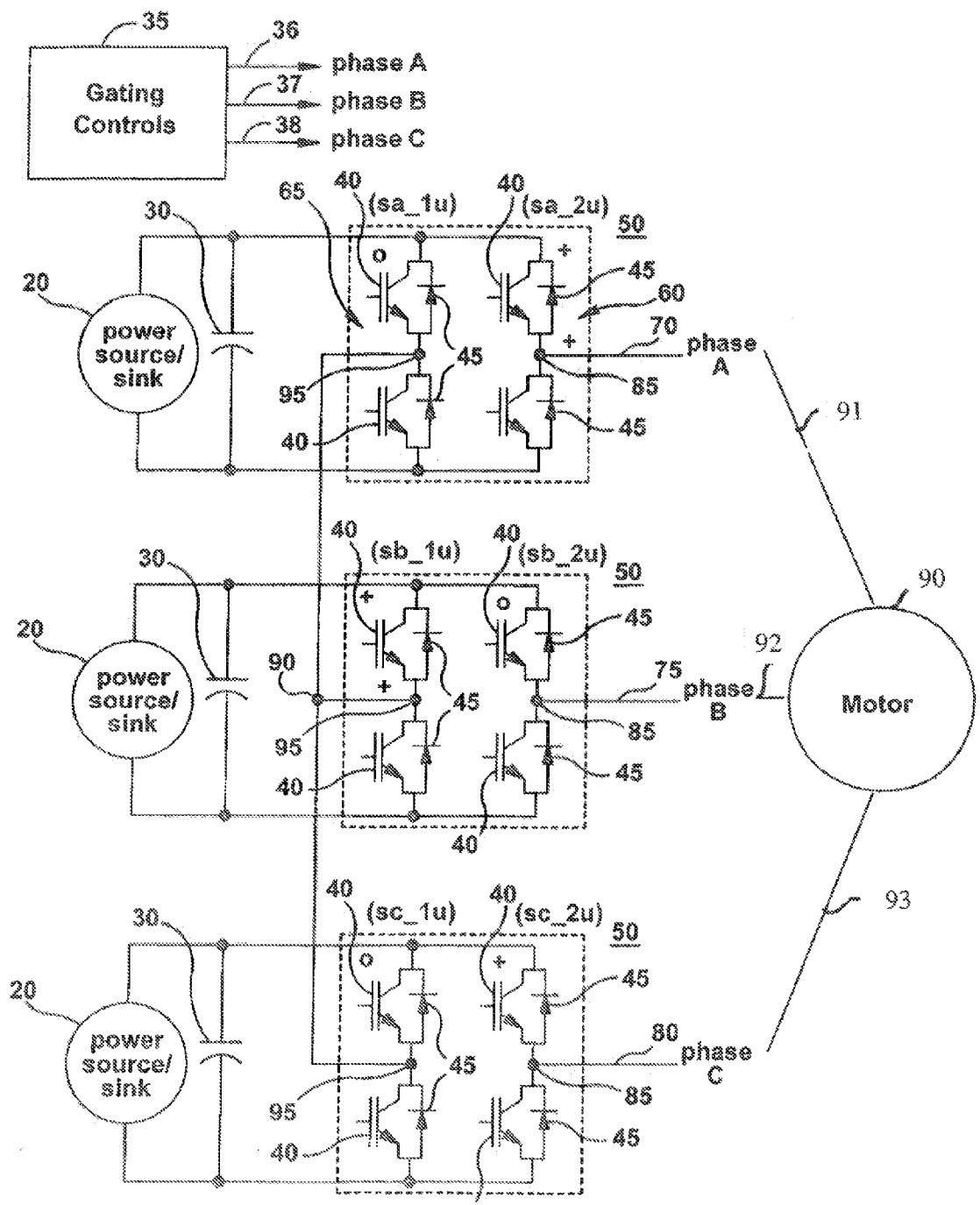
FIG. 1 illustrates a simplified three-phase, wye-connected H-bridge converter configuration.
Figure 8:
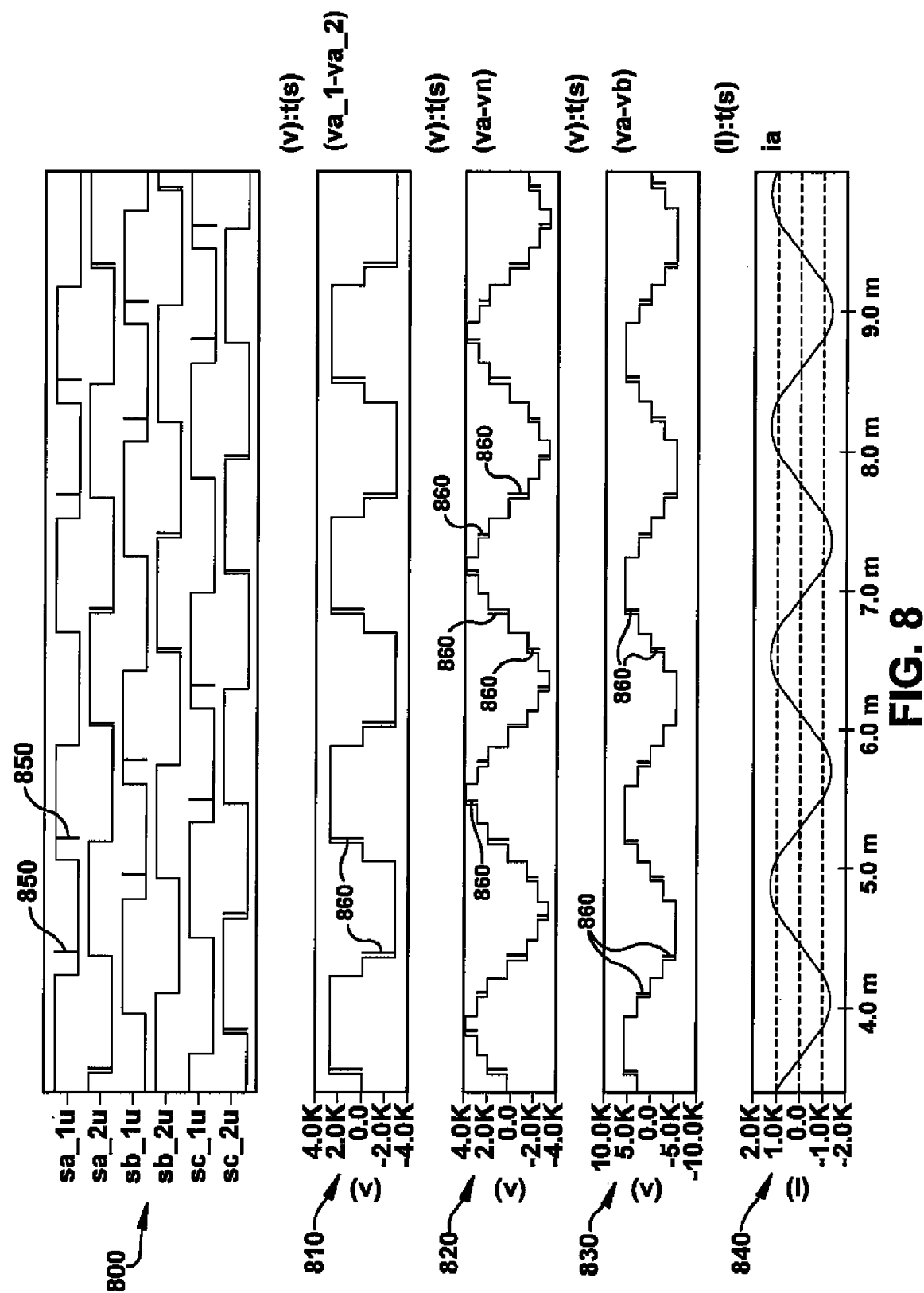
FIG. 8 provides a graph illustrating input and output waveforms for a three-phase, wye-connected H-bridge employing an inventive optimized ZCNotch2 switching waveform.
Figure 9A:
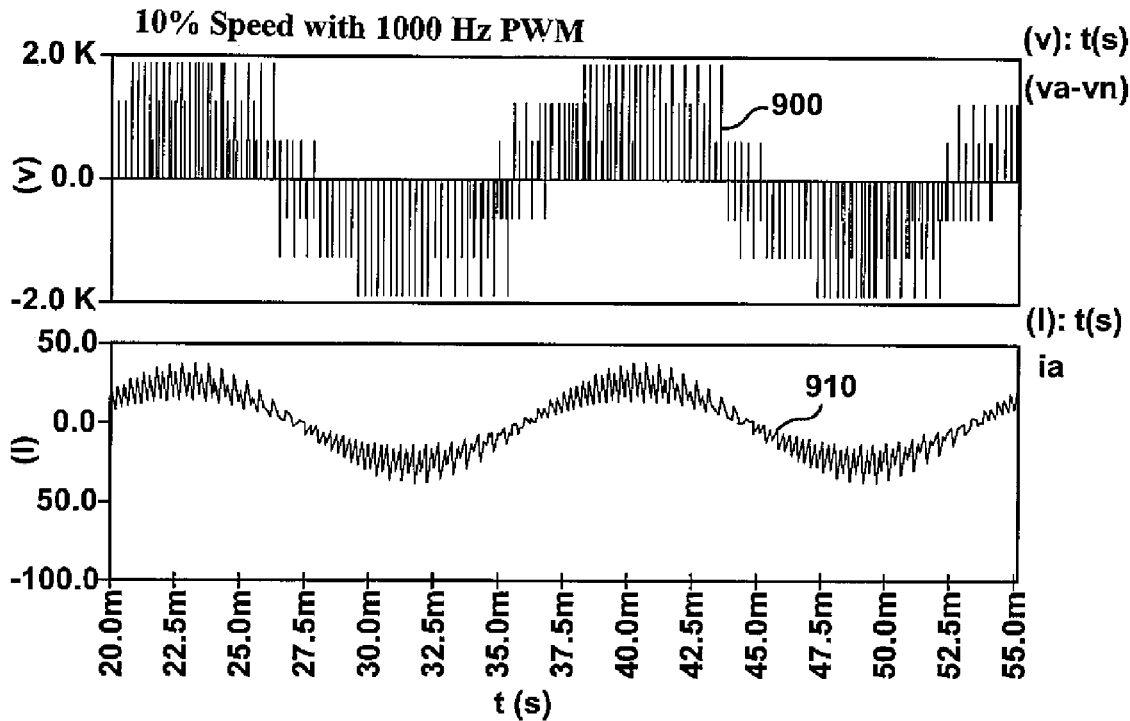
FIGS. 9A-9J illustrate the line voltage to neutral voltage and the load current for a phase of three-phase, wye-connected H-bridge converter under the inventive control strategies for powering an exemplary 6 MW high-speed motor over the full range of motor speed operation.
Figure 9B:
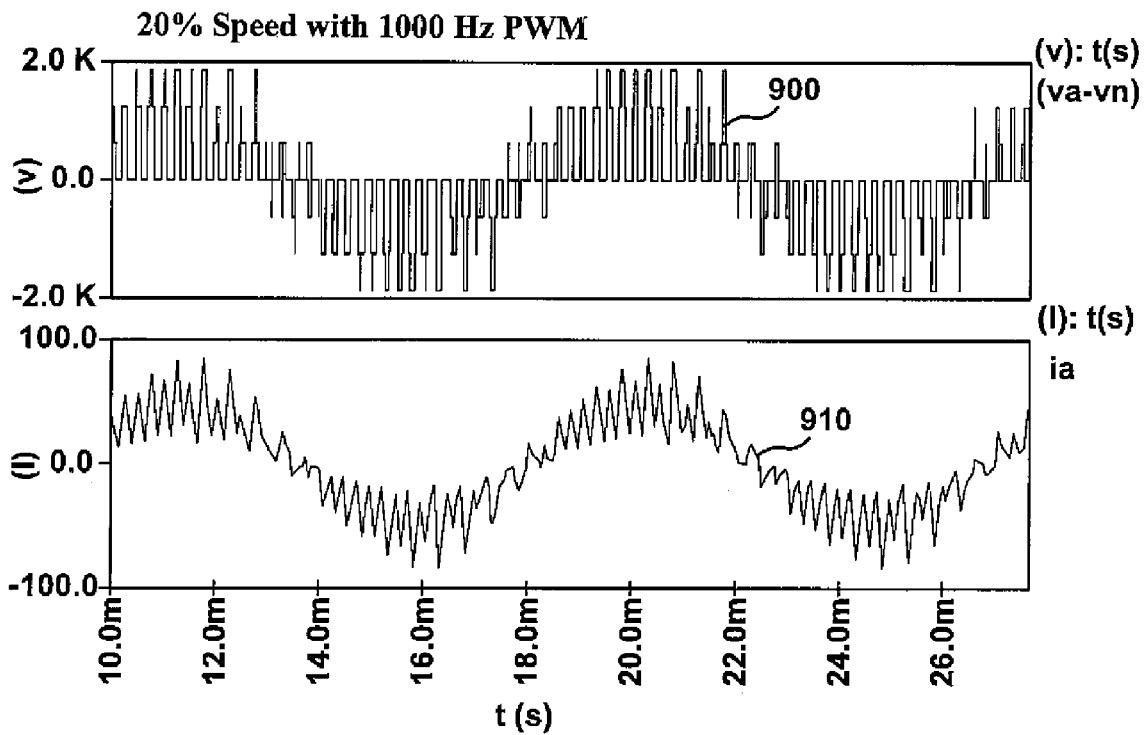
Figure 9C:
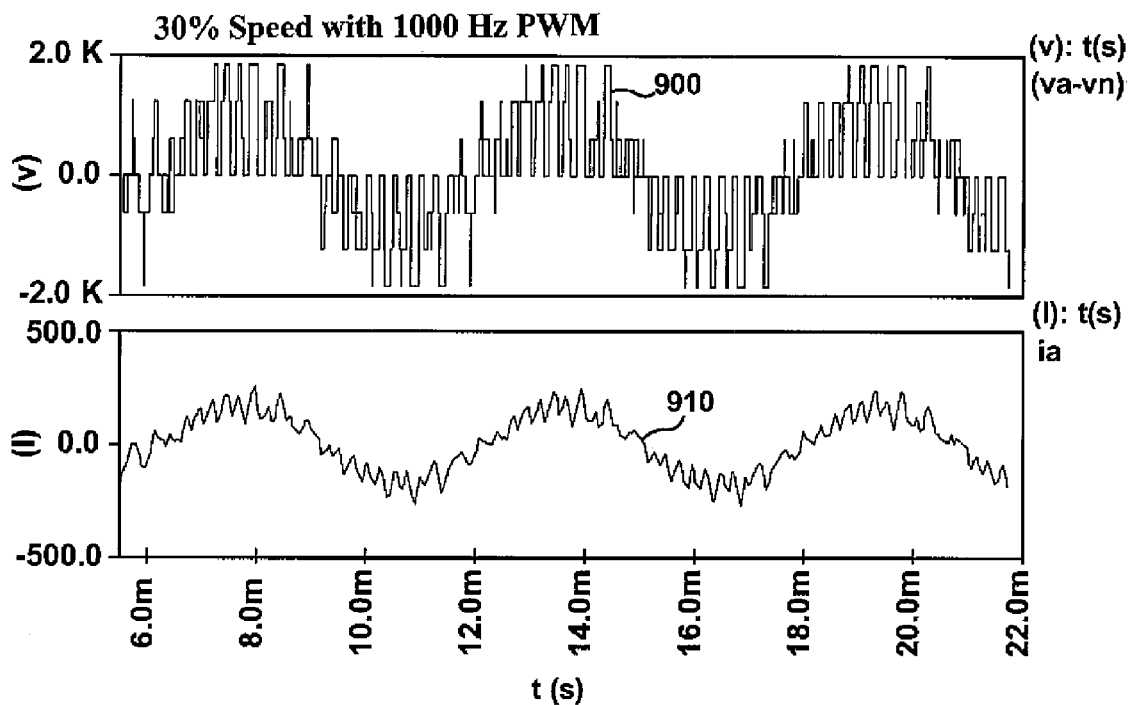
Figure 9D:
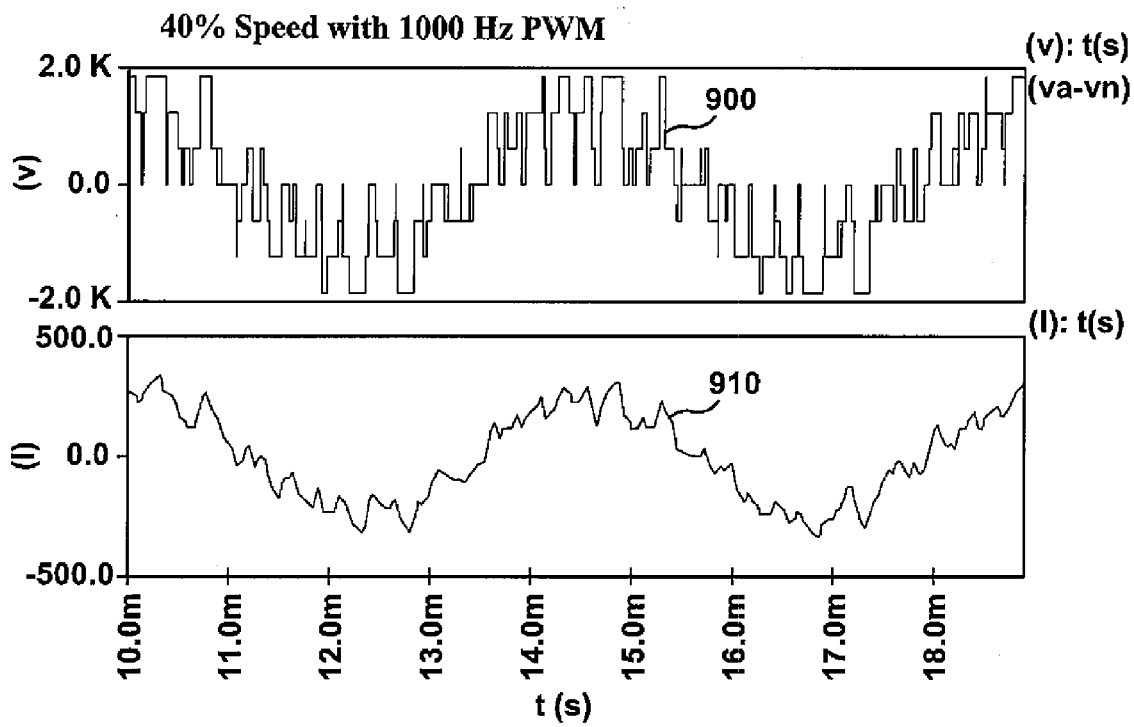
Figure 9E:
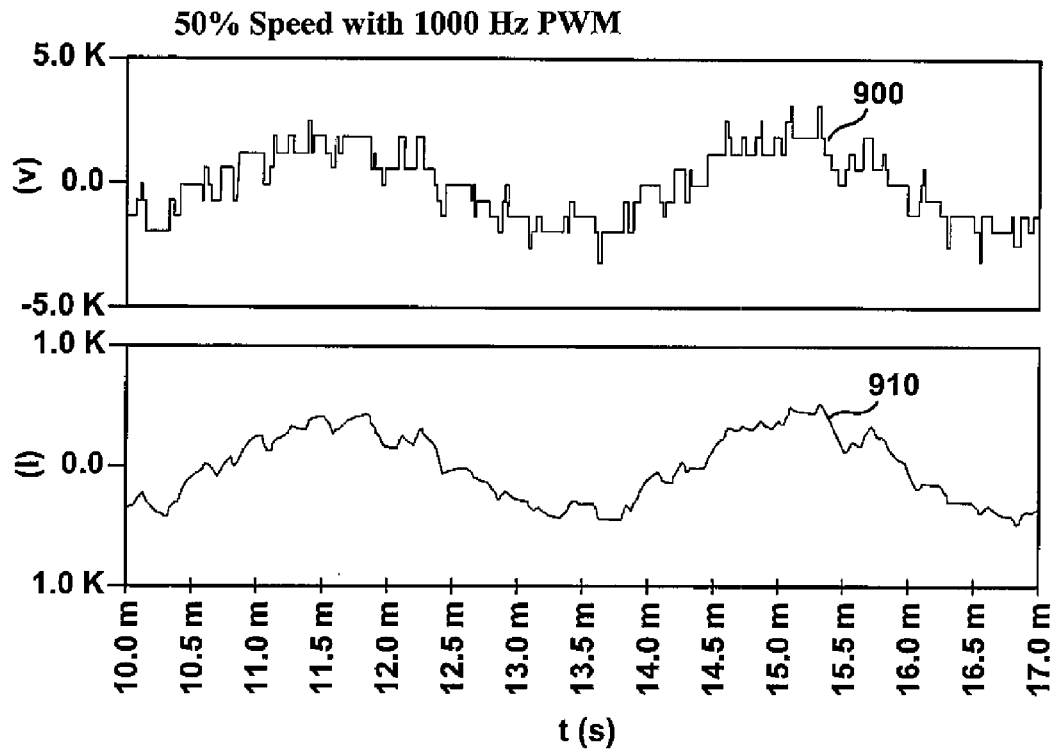
Figure 9F:
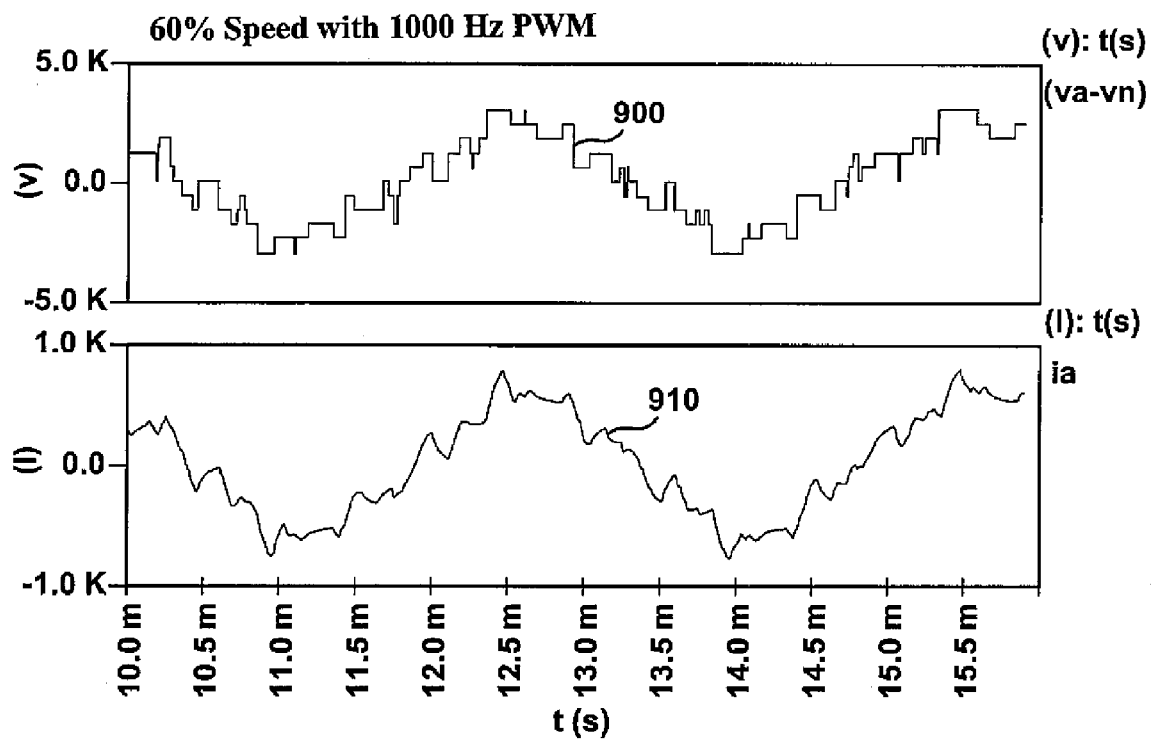
Figure 9G:
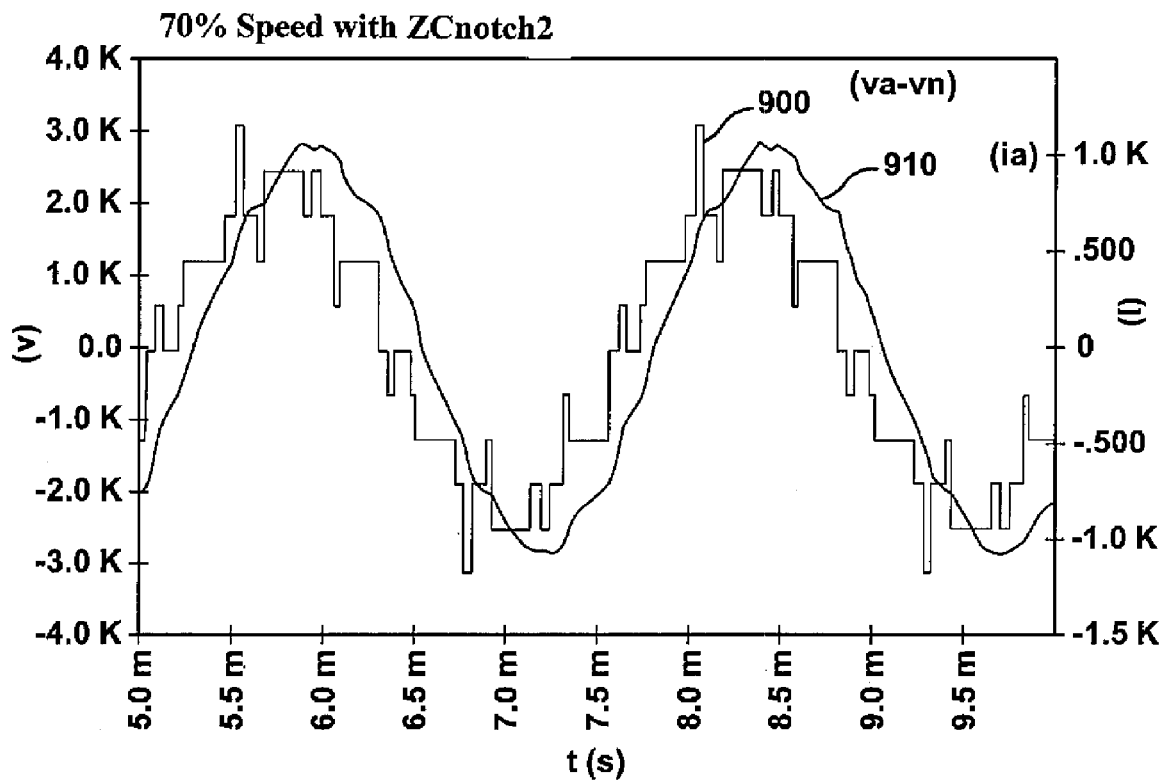
Figure 9H:
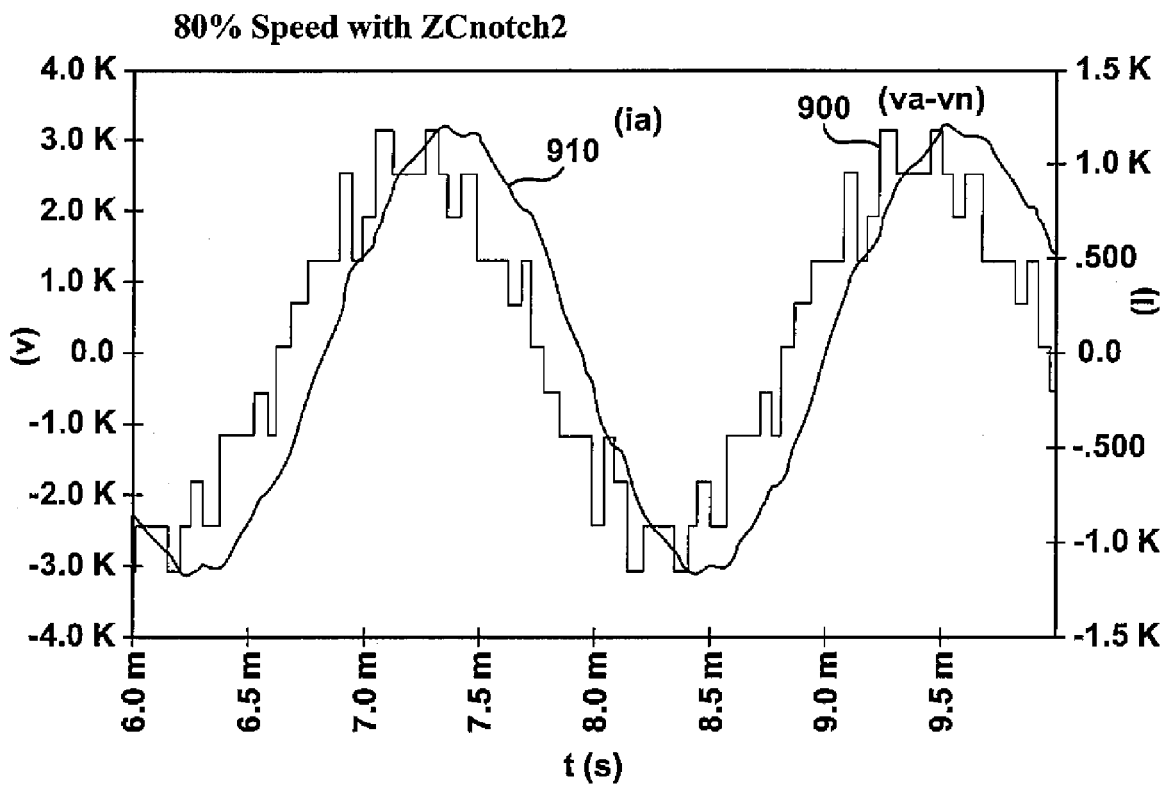
Figure 9I:
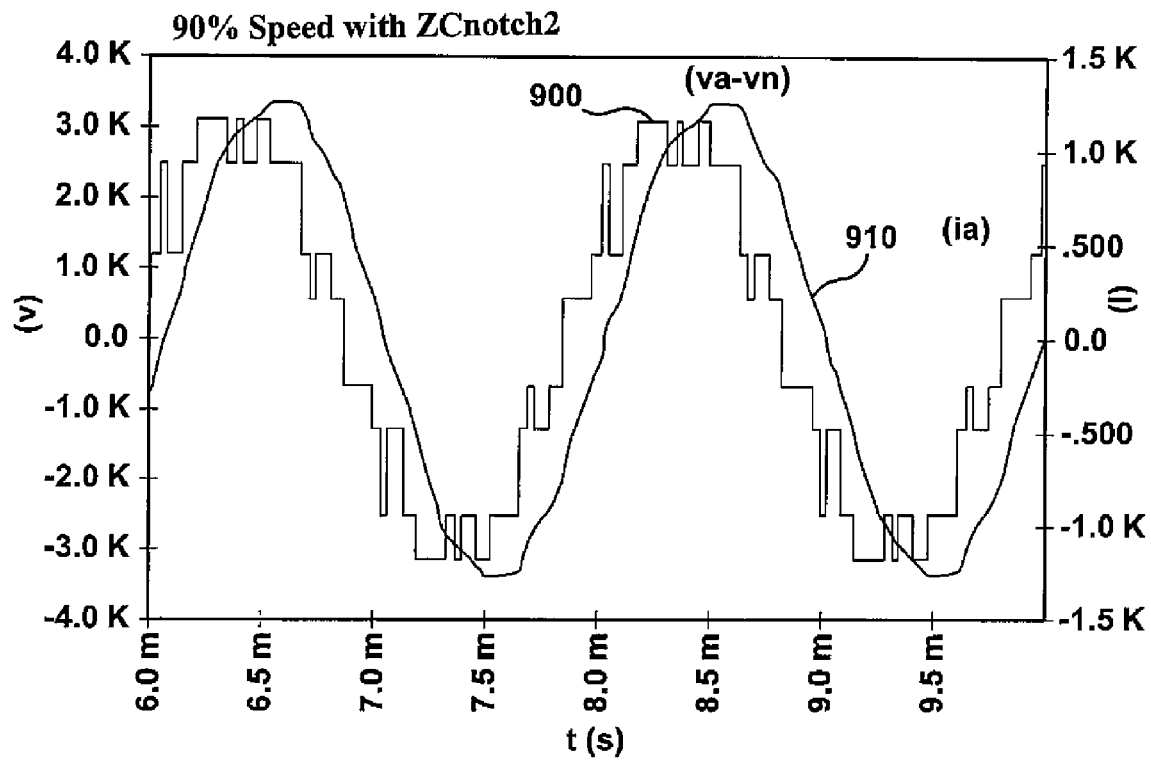
Figure 9J:
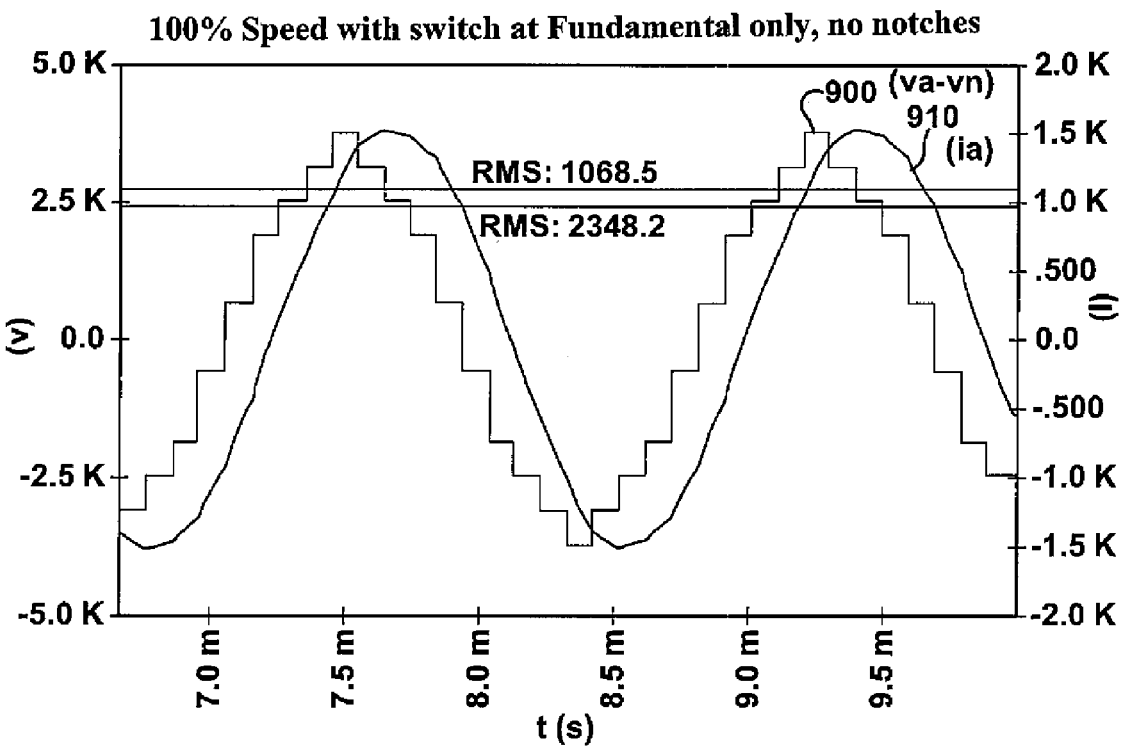

FIG. 8 provides a graph illustrating input and output waveforms for a three-phase, wye-connected H-bridge employing an inventive optimized ZCNotch2 switching waveform. The ZCnotch2 waveform incorporates a notch of a designated width at a designated offset from the zero-crossing of the load current. The first graph 800 illustrates the ZCnotch2 signals to the upper switches sa_1u, sa_2u, sb_1u sb_2u, sc_1u, and sc_2u (referring to the upper switches in leg1 and leg 2 of phase A, phase B and phase C of the H-bridge converter. The second graph 810 illustrates the voltage between the mid-points of leg 1 and leg 2 of the phase A of the H-bridge. The third graph 820 illustrates the voltage between phase A output and the neutral. The fourth graph 830 illustrates line-to-line voltage between phase A output and phase B output. The fifth graph 840 illustrates load current output. Refer to FIG. 1 for identification of upper switches. Notches 850 on the switching waveform 800 and notches 860 on output voltage waveforms 810, 820, 830 are identified.

TABLEs 4A-4I illustrate optimized results of harmonic performance for with the inventive Zcnotch2 switching waveforms on load current IA, V1-N, V1-1 and Vbridge. TABLE 4A illustrates harmonic performance with a 2-degree notch, positioned 19 degrees from the voltage zero. TABLE 4B illustrates harmonic performance with a 2-degree notch width, positioned 20 degrees from the voltage zero. TABLE 4C illustrates harmonic performance with a 2-degree notch width, positioned 21 degrees from the voltage zero. TABLE 4D illustrates harmonic performance with a 4-degree notch, positioned 18 degrees from the voltage zero. TABLE 4E illustrates harmonic performance with a 4-degree notch, positioned 20 degrees from the voltage zero. TABLE 4F illustrates harmonic performance with a 4-degree notch, positioned 21 degrees from the voltage zero. TABLE 4G illustrates harmonic performance with a 6-degree notch, positioned 20 degrees from the voltage zero. TABLE 4H illustrates harmonic performance with a 3.4-degree notch, positioned 20.4 degrees from the voltage zero.

TABLE 4A

| IA | | V1-n | | V1-l | | Vbridge | |
|---|---|---|---|---|---|---|---|
| THD | 2.25% | THD | 17.54% | THD | 17.51% | THD | 31.73% |
| fund (A rms) | 963.71 | fund (V rms) | 2415.47 | fund (V rms) | 4185 | fund (V rms) | 2418.81 |
| 2nd harmonic | 0.12% | 2nd harmonic | 0.22% | 2nd harmonic | 0.25% | 2nd harmonic | 0.32% |
| 3rd harmonic | 0.05% | 3rd harmonic | 0.05% | 3rd harmonic | 0.10% | 3rd harmonic | 23.01% |
| 4th harmonic | 0.04% | 4th harmonic | 0.27% | 4th harmonic | 0.23% | 4th harmonic | 0.32% |
| 5th harmonic | 1.10% | 5th harmonic | 3.58% | 5th harmonic | 3.67% | 5th harmonic | 3.62% |
| 6th harmonic | 0.00% | 6th harmonic | 0.22% | 6th harmonic | 0.11% | 6th harmonic | 0.32% |
| 7th harmonic | 1.25% | 7th harmonic | 5.21% | 7th harmonic | 5.16% | 7th harmonic | 5.21% |
| 8th harmonic | 0.02% | 8th harmonic | 0.27% | 8th harmonic | 0.22% | 8th harmonic | 0.32% |
| 9th harmonic | 0.02% | 9th harmonic | 0.09% | 9th harmonic | 0.14% | 9th harmonic | 8.38% |
| 10th harmonic | 0.03% | 10th harmonic | 0.22% | 10th harmonic | 0.25% | 10th harmonic | 0.32% |
| 11th harmonic | 1.20% | 11th harmonic | 7.95% | 11th harmonic | 7.95% | 11th harmonic | 8.07% |
| 12th harmonic | 0.00% | 12th harmonic | 0.11% | 12th harmonic | 0.08% | 12th harmonic | 0.32% |
| 13th harmonic | 0.74% | 13th harmonic | 5.96% | 13th harmonic | 5.94% | 13th harmonic | 5.91% |
| 14th harmonic | 0.02% | 14th harmonic | 0.22% | 14th harmonic | 0.25% | 14th harmonic | 0.32% |
| 15th harmonic | 0.01% | 15th harmonic | 0.06% | 15th harmonic | 0.10% | 15th harmonic | 3.43% |
| 16th harmonic | 0.01% | 16th harmonic | 0.27% | 16th harmonic | 0.23% | 16th harmonic | 0.32% |
| 17th harmonic | 0.20% | 17th harmonic | 1.98% | 17th harmonic | 1.99% | 17th harmonic | 2.01% |
| 18th harmonic | 0.00% | 18th harmonic | 0.22% | 18th harmonic | 0.11% | 18th harmonic | 0.32% |
| 19th harmonic | 0.17% | 19th harmonic | 1.97% | 19th harmonic | 1.98% | 19th harmonic | 1.96% |

TABLE 4B

| IA | | Vl-n | | Vl-l | | Vbridge | |
|---|---|---|---|---|---|---|---|
| THD | 2.23% | THD | 17.90% | THD | 17.83% | THD | 31.77% |
| fund (A rms) | 963.39 | fund (V rms) | 2411.31 | fund (V rms) | 4172.16 | fund (V rms) | 2412.78 |
| 2nd harmonic | 0.12% | 2nd harmonic | 0.22% | 2nd harmonic | 0.25% | 2nd harmonic | 0.32% |
| 3rd harmonic | 0.05% | 3rd harmonic | 0.39% | 3rd harmonic | 0.39% | 3rd harmonic | 22.46% |
| 4th harmonic | 0.04% | 4th harmonic | 0.27% | 4th harmonic | 0.23% | 4th harmonic | 0.32% |
| 5th harmonic | 1.12% | 5th harmonic | 3.24% | 5th harmonic | 3.35% | 5th harmonic | 3.11% |
| 6th harmonic | 0.00% | 6th harmonic | 0.22% | 6th harmonic | 0.11% | 6th harmonic | 0.32% |
| 7th harmonic | 1.22% | 7th harmonic | 5.44% | 7th harmonic | 5.19% | 7th harmonic | 5.59% |
| 8th harmonic | 0.02% | 8th harmonic | 0.27% | 8th harmonic | 0.23% | 8th harmonic | 0.32% |
| 9th harmonic | 0.02% | 9th harmonic | 0.36% | 9th harmonic | 0.26% | 9th harmonic | 8.17% |
| 10th harmonic | 0.03% | 10th harmonic | 0.22% | 10th harmonic | 0.26% | 10th harmonic | 0.32% |
| 11th harmonic | 1.15% | 11th harmonic | 7.41% | 11th harmonic | 7.64% | 11th harmonic | 7.38% |
| 12th harmonic | 0.00% | 12th harmonic | 0.11% | 12th harmonic | 0.08% | 12th harmonic | 0.32% |
| 13th harmonic | 0.73% | 13th harmonic | 5.52% | 13th harmonic | 5.65% | 13th harmonic | 5.26% |
| 14th harmonic | 0.02% | 14th harmonic | 0.22% | 14th harmonic | 0.25% | 14th harmonic | 0.32% |
| 15th harmonic | 0.01% | 15th harmonic | 0.45% | 15th harmonic | 0.47% | 15th harmonic | 3.63% |
| 16th harmonic | 0.01% | 16th harmonic | 0.27% | 16th harmonic | 0.23% | 16th harmonic | 0.32% |
| 17th harmonic | 0.24% | 17th harmonic | 2.68% | 17th harmonic | 2.52% | 17th harmonic | 2.92% |
| 18th harmonic | 0.00% | 18th harmonic | 0.22% | 18th harmonic | 0.11% | 18th harmonic | 0.32% |
| 19th harmonic | 0.13% | 19th harmonic | 1.88% | 19th harmonic | 1.72% | 19th harmonic | 1.99% |

TABLE 4C

| IA | | Vl-n | | Vl-l | | Vbridge | |
|---|---|---|---|---|---|---|---|
| THD | 2.23% | THD | 18.00% | THD | 17.90% | THD | 31.96% |
| fund (A rms) | 963.07 | fund (V rms) | 2408.85 | fund (V rms) | 4182.23 | fund (V rms) | 2417.21 |
| 2nd harmonic | 0.12% | 2nd harmonic | 0.22% | 2nd harmonic | 0.25% | 2nd harmonic | 0.32% |
| 3rd harmonic | 0.05% | 3rd harmonic | 0.25% | 3rd harmonic | 0.10% | 3rd harmonic | 22.92% |
| 4th harmonic | 0.04% | 4th harmonic | 0.27% | 4th harmonic | 0.23% | 4th harmonic | 0.32% |
| 5th harmonic | 1.15% | 5th harmonic | 3.55% | 5th harmonic | 3.80% | 5th harmonic | 3.76% |
| 6th harmonic | 0.00% | 6th harmonic | 0.22% | 6th harmonic | 0.11% | 6th harmonic | 0.32% |
| 7th harmonic | 1.18% | 7th harmonic | 4.91% | 7th harmonic | 4.86% | 7th harmonic | 4.91% |
| 8th harmonic | 0.02% | 8th harmonic | 0.27% | 8th harmonic | 0.22% | 8th harmonic | 0.32% |
| 9th harmonic | 0.02% | 9th harmonic | 0.26% | 9th harmonic | 0.13% | 9th harmonic | 7.75% |
| 10th harmonic | 0.03% | 10th harmonic | 0.22% | 10th harmonic | 0.25% | 10th harmonic | 0.32% |
| 11th harmonic | 1.12% | 11th harmonic | 7.46% | 11th harmonic | 7.40% | 11th harmonic | 7.50% |
| 12th harmonic | 0.00% | 12th harmonic | 0.11% | 12th harmonic | 0.08% | 12th harmonic | 0.32% |
| 13th harmonic | 0.74% | 13th harmonic | 5.97% | 13th harmonic | 6.00% | 13th harmonic | 5.96% |
| 14th harmonic | 0.02% | 14th harmonic | 0.22% | 14th harmonic | 0.25% | 14th harmonic | 0.32% |
| 15th harmonic | 0.01% | 15th harmonic | 0.14% | 15th harmonic | 0.13% | 15th harmonic | 4.35% |
| 16th harmonic | 0.01% | 16th harmonic | 0.27% | 16th harmonic | 0.23% | 16th harmonic | 0.32% |
| 17th harmonic | 0.27% | 17th harmonic | 2.73% | 17th harmonic | 2.81% | 17th harmonic | 2.83% |
| 18th harmonic | 0.00% | 18th harmonic | 0.22% | 18th harmonic | 0.11% | 18th harmonic | 0.32% |
| 19th harmonic | 0.09% | 19th harmonic | 1.11% | 19th harmonic | 1.12% | 19th harmonic | 1.07% |

TABLE 4D

| IA | | Vl-n | | Vl-l | | Vbridge | |
|---|---|---|---|---|---|---|---|
| THD | 2.23% | THD | 18.14% | THD | 18.04% | THD | 31.41% |
| fund (A rms) | 958.17 | fund (V rms) | 2400.66 | fund (V rms) | 4159.91 | fund (V rms) | 2403.7 |
| 2nd harmonic | 0.12% | 2nd harmonic | 0.22% | 2nd harmonic | 0.25% | 2nd harmonic | 0.32% |
| 3rd harmonic | 0.05% | 3rd harmonic | 0.11% | 3rd harmonic | 0.17% | 3rd harmonic | 21.53% |
| 4th harmonic | 0.04% | 4th harmonic | 0.27% | 4th harmonic | 0.23% | 4th harmonic | 0.32% |
| 5th harmonic | 0.57% | 5th harmonic | 1.81% | 5th harmonic | 1.85% | 5th harmonic | 1.91% |
| 6th harmonic | 0.00% | 6th harmonic | 0.22% | 6th harmonic | 0.11% | 6th harmonic | 0.32% |
| 7th harmonic | 1.62% | 7th harmonic | 6.87% | 7th harmonic | 6.78% | 7th harmonic | 6.84% |
| 8th harmonic | 0.02% | 8th harmonic | 0.27% | 8th harmonic | 0.23% | 8th harmonic | 0.32% |
| 9th harmonic | 0.02% | 9th harmonic | 0.16% | 9th harmonic | 0.13% | 9th harmonic | 8.89% |
| 10th harmonic | 0.03% | 10th harmonic | 0.22% | 10th harmonic | 0.26% | 10th harmonic | 0.32% |
| 11th harmonic | 1.10% | 11th harmonic | 7.20% | 11th harmonic | 7.27% | 11th harmonic | 7.20% |
| 12th harmonic | 0.00% | 12th harmonic | 0.11% | 12th harmonic | 0.08% | 12th harmonic | 0.32% |
| 13th harmonic | 0.53% | 13th harmonic | 4.27% | 13th harmonic | 4.40% | 13th harmonic | 4.15% |
| 14th harmonic | 0.02% | 14th harmonic | 0.22% | 14th harmonic | 0.25% | 14th harmonic | 0.32% |
| 15th harmonic | 0.01% | 15th harmonic | 0.29% | 15th harmonic | 0.33% | 15th harmonic | 2.80% |
| 16th harmonic | 0.01% | 16th harmonic | 0.27% | 16th harmonic | 0.23% | 16th harmonic | 0.32% |
| 17th harmonic | 0.33% | 17th harmonic | 3.43% | 17th harmonic | 3.47% | 17th harmonic | 3.56% |
| 18th harmonic | 0.00% | 18th harmonic | 0.22% | 18th harmonic | 0.11% | 18th harmonic | 0.32% |
| 19th harmonic | 0.29% | 19th harmonic | 3.32% | 19th harmonic | 3.26% | 19th harmonic | 3.27% |

TABLE 4E

| IA | | Vl-n | | Vl-l | | Vbridge | |
|---|---|---|---|---|---|---|---|
| THD | 2.17% | THD | 18.73% | THD | 18.70% | THD | 31.72% |
| fund (A rms) | 956.95 | fund (V rms) | 2398.19 | fund (V rms) | 4155.07 | fund (V rms) | 2401.56 |
| 2nd harmonic | 0.12% | 2nd harmonic | 0.22% | 2nd harmonic | 0.25% | 2nd harmonic | 0.32% |
| 3rd harmonic | 0.05% | 3rd harmonic | 0.04% | 3rd harmonic | 0.09% | 3rd harmonic | 21.39% |
| 4th harmonic | 0.04% | 4th harmonic | 0.27% | 4th harmonic | 0.23% | 4th harmonic | 0.32% |
| 5th harmonic | 0.72% | 5th harmonic | 2.17% | 5th harmonic | 2.28% | 5th harmonic | 2.23% |
| 6th harmonic | 0.00% | 6th harmonic | 0.22% | 6th harmonic | 0.11% | 6th harmonic | 0.32% |
| 7th harmonic | 1.52% | 7th harmonic | 6.53% | 7th harmonic | 6.50% | 7th harmonic | 6.54% |
| 8th harmonic | 0.02% | 8th harmonic | 0.27% | 8th harmonic | 0.23% | 8th harmonic | 0.32% |
| 9th harmonic | 0.02% | 9th harmonic | 0.13% | 9th harmonic | 0.16% | 9th harmonic | 8.10% |
| 10th harmonic | 0.03% | 10th harmonic | 0.22% | 10th harmonic | 0.26% | 10th harmonic | 0.32% |
| 11th harmonic | 0.92% | 11th harmonic | 6.16% | 11th harmonic | 6.22% | 11th harmonic | 6.33% |
| 12th harmonic | 0.00% | 12th harmonic | 0.11% | 12th harmonic | 0.08% | 12th harmonic | 0.32% |
| 13th harmonic | 0.55% | 13th harmonic | 4.35% | 13th harmonic | 4.26% | 13th harmonic | 4.23% |
| 14th harmonic | 0.02% | 14th harmonic | 0.22% | 14th harmonic | 0.25% | 14th harmonic | 0.32% |
| 15th harmonic | 0.01% | 15th harmonic | 0.19% | 15th harmonic | 0.17% | 15th harmonic | 4.15% |
| 16th harmonic | 0.01% | 16th harmonic | 0.27% | 16th harmonic | 0.23% | 16th harmonic | 0.32% |
| 17th harmonic | 0.42% | 17th harmonic | 4.21% | 17th harmonic | 4.14% | 17th harmonic | 4.22% |
| 18th harmonic | 0.00% | 18th harmonic | 0.22% | 18th harmonic | 0.11% | 18th harmonic | 0.32% |
| 19th harmonic | 0.21% | 19th harmonic | 2.62% | 19th harmonic | 2.79% | 19th harmonic | 2.69% |

TABLE 4F

| IA | | Vl-n | | Vl-l | | Vbridge | |
|---|---|---|---|---|---|---|---|
| THD | 2.18% | THD | 19.20% | THD | 19.18% | THD | 32.03% |
| fund (A rms) | 956.35 | fund (V rms) | 2396.12 | fund (V rms) | 4151.38 | fund (V rms) | 2399.42 |
| 2nd harmonic | 0.12% | 2nd harmonic | 0.22% | 2nd harmonic | 0.25% | 2nd harmonic | 0.32% |
| 3rd harmonic | 0.05% | 3rd harmonic | 0.07% | 3rd harmonic | 0.09% | 3rd harmonic | 21.28% |
| 4th harmonic | 0.04% | 4th harmonic | 0.27% | 4th harmonic | 0.23% | 4th harmonic | 0.32% |
| 5th harmonic | 0.81% | 5th harmonic | 2.57% | 5th harmonic | 2.66% | 5th harmonic | 2.63% |
| 6th harmonic | 0.00% | 6th harmonic | 0.22% | 6th harmonic | 0.11% | 5th harmonic | 0.32% |
| 7th harmonic | 1.46% | 7th harmonic | 6.29% | 7th harmonic | 6.15% | 7th harmonic | 6.19% |
| 8th harmonic | 0.02% | 8th harmonic | 0.27% | 8th harmonic | 0.23% | 8th harmonic | 0.32% |
| 9th harmonic | 0.02% | 9th harmonic | 0.06% | 9th harmonic | 0.14% | 9th harmonic | 7.27% |
| 10th harmonic | 0.03% | 10th harmonic | 0.22% | 10th harmonic | 0.26% | 10th harmonic | 0.32% |
| 11th harmonic | 0.86% | 11th harmonic | 5.71% | 11th harmonic | 5.61% | 11th harmonic | 5.69% |
| 12th harmonic | 0.00% | 12th harmonic | 0.11% | 12th harmonic | 0.08% | 12th harmonic | 0.32% |
| 13th harmonic | 0.62% | 13th harmonic | 4.88% | 13th harmonic | 4.99% | 13th harmonic | 4.93% |
| 14th harmonic | 0.02% | 14th harmonic | 0.22% | 14th harmonic | 0.25% | 14th harmonic | 0.32% |
| 15th harmonic | 0.01% | 15th harmonic | 0.08% | 15th harmonic | 0.20% | 15th harmonic | 5.44% |
| 16th harmonic | 0.01% | 16th harmonic | 0.27% | 16th harmonic | 0.23% | 16th harmonic | 0.32% |
| 17th harmonic | 0.45% | 17th harmonic | 4.51% | 17th harmonic | 4.69% | 17th harmonic | 4.75% |
| 18th harmonic | 0.00% | 18th harmonic | 0.22% | 18th harmonic | 0.11% | 18th harmonic | 0.32% |
| 19th harmonic | 0.19% | 19th harmonic | 2.46% | 19th harmonic | 2.43% | 19th harmonic | 2.30% |

TABLE 4G

| IA | | Vl-n | | Vl-l | | Vbridge | |
|---|---|---|---|---|---|---|---|
| THD | 2.43% | THD | 20.57% | THD | 20.57% | THD | 32.20% |
| fund (A rms) | 949.33 | fund (V rms) | 2377.52 | fund (V rms) | 4119.12 | fund (V rms) | 2380.82 |
| 2nd harmonic | 0.12% | 2nd harmonic | 0.23% | 2nd harmonic | 0.26% | 2nd harmonic | 0.32% |
| 3rd harmonic | 0.04% | 3rd harmonic | 0.07% | 3rd harmonic | 0.08% | 3rd harmonic | 19.58% |
| 4th harmonic | 0.04% | 4th harmonic | 0.27% | 4th harmonic | 0.23% | 4th harmonic | 0.32% |
| 5th harmonic | 0.92% | 5th harmonic | 2.85% | 5th harmonic | 2.96% | 5th harmonic | 2.98% |
| 6th harmonic | 0.00% | 6th harmonic | 0.22% | 6th harmonic | 0.11% | 6th harmonic | 0.32% |
| 7th harmonic | 1.74% | 7th harmonic | 7.61% | 7th harmonic | 7.45% | 7th harmonic | 7.46% |
| 8th harmonic | 0.02% | 8th harmonic | 0.27% | 8th harmonic | 0.23% | 8th harmonic | 0.32% |
| 9th harmonic | 0.02% | 9th harmonic | 0.06% | 9th harmonic | 0.16% | 9th harmonic | 6.65% |
| 10th harmonic | 0.03% | 10th harmonic | 0.22% | 10th harmonic | 0.26% | 10th harmonic | 0.32% |
| 11th harmonic | 0.59% | 11th harmonic | 3.89% | 11th harmonic | 3.78% | 11th harmonic | 3.82% |
| 12th harmonic | 0.00% | 12th harmonic | 0.11% | 12th harmonic | 0.09% | 12th harmonic | 0.32% |
| 13th harmonic | 0.67% | 13th harmonic | 5.40% | 13th harmonic | 5.51% | 13th harmonic | 5.40% |
| 14th harmonic | 0.02% | 14th harmonic | 0.22% | 14th harmonic | 0.25% | 14th harmonic | 0.32% |
| 15th harmonic | 0.02% | 15th harmonic | 0.08% | 15th harmonic | 0.27% | 15th harmonic | 7.35% |
| 16th harmonic | 0.01% | 18th harmonic | 0.28% | 16th harmonic | 0.23% | 16th harmonic | 0.32% |
| 17th harmonic | 0.61% | 17th harmonic | 8.15% | 17th harmonic | 6.35% | 17th harmonic | 6.44% |
| 18th harmonic | 0.00% | 18th harmonic | 0.22% | 18th harmonic | 0.11% | 18th harmonic | 0.32% |
| 19th harmonic | 0.29% | 19th harmonic | 3.68% | 19th harmonic | 3.67% | 19th harmonic | 3.52% |

TABLE 4H

| IA | | Vl-n | | Vl-l | | Vbridge | |
|---|---|---|---|---|---|---|---|
| THD | 2.16% | THD | 18.57% | THD | 18.54% | THD | 31.87% |
| fund (A rms) | 958.71 | fund(V rms) | 2402.98 | fund (V rms) | 4163.34 | fund (V rms) | 2406.33 |
| 2nd harmonic | 0.12% | 2nd harmonic | 0.22% | 2nd harmonic | 0.25% | 2nd harmonic | 0.32% |
| 3rd harmonic | 0.05% | 3rd harmonic | 0.04% | 3rd harmonic | 0.09% | 3rd harmonic | 21.88% |
| 4th harmonic | 0.04% | 4th harmonic | 0.27% | 4th harmonic | 0.23% | 4th harmonic | 0.32% |
| 5th harmonic | 0.84% | 5th harmonic | 2.69% | 5th harmonic | 2.79% | 5th harmonic | 2.74% |
| 6th harmonic | 0.00% | 6th harmonic | 0.22% | 6th harmonic | 0.11% | 6th harmonic | 0.32% |
| 7th harmonic | 1.41% | 7th harmonic | 5.92% | 7th harmonic | 5.88% | 7th harmonic | 5.92% |
| 8th harmonic | 0.02% | 8th harmonic | 0.27% | 8th harmonic | 0.23% | 8th harmonic | 0.32% |
| 9th harmonic | 0.02% | 9th harmonic | 0.11% | 9th harmonic | 0.14% | 9th harmonic | 7.80% |
| 10th harmonic | 0.03% | 10th harmonic | 0.22% | 10th harmonic | 0.26% | 10th harmonic | 0.32% |
| 11th harmonic | 0.97% | 11th harmonic | 6.41% | 11th harmonic | 6.46% | 11th harmonic | 6.56% |
| 12th harmonic | 0.00% | 12th harmonic | 0.11% | 12th harmonic | 0.08% | 12th harmonic | 0.32% |
| 13th harmonic | 0.61% | 13th harmonic | 4.97% | 13th harmonic | 4.90% | 13th harmonic | 4.86% |
| 14th harmonic | 0.02% | 14th harmonic | 0.22% | 14th harmonic | 0.25% | 14th harmonic | 0.32% |
| 15th harmonic | 0.01% | 15th harmonic | 0.16% | 15th harmonic | 0.16% | 15th harmonic | 4.36% |
| 16th harmonic | 0.01% | 16th harmonic | 0.27% | 16th harmonic | 0.23% | 16th harmonic | 0.32% |
| 17th harmonic | 0.38% | 17th harmonic | 3.85% | 17th harmonic | 3.80% | 17th harmonic | 3.86% |
| 18th harmonic | 0.00% | 18th harmonic | 0.22% | 18th harmonic | 0.11% | 18th harmonic | 0.32% |
| 19th harmonic | 0.17% | 19th harmonic | 2.01% | 19th harmonic | 2.17% | 19th harmonic | 2.07% |

An analysis was performed to compare the thermal performance of the PP1.5 switching waveform with the ZCnotch2 switching waveform at maximum current for each application. In the following example using a SABER analysis, a 600 Hz sine wave modulated by the ZCnotch2 switching waveform is compared with a 600 Hz sine wave is modulated by the PP1.5 PP switching waveform. For the example, the three-phase, wye-connected H-bridge employed ABB 5SHX 351A511 IGCT with Eoff reduced by 22.5% with RC snubbers, with Eupec D1331SH diode. System parameters included a 3300 VAC 0.8 PF motor with 2800 VDC link, 40 degree C. water temperature and 115 C. maximum junction temperature. Results of the analysis are provided as TABLE 5. Switching with the ZCnotch2 waveform compared to the PP1.5 waveform resulted in lower total IGCT power loss, comparable IGCT temperature, comparable diode temperature and a slightly higher, but acceptable diode loss. TABLE 6 identifies the parameters employed in the SABER analysis of the H-bridge operation. While the ZCnotch2 waveform provided comparable thermal performance to the PP1.5 switching waveform for the semiconductor switching devices, the ZCnotch2 waveform was tested at 1463 amps compared to the PP1.5 waveform performance at 1373 amps, indicating greater MVA capability with the ZCnotch2 use, as identified in TABLE 7.

TABLE 5

| Device | Parameter | 600 Hz sine wave modulated with ZCnotch2 pulse pattern | 600 Hz sine wave modulated with PP 1.5 |
|---|---|---|---|
| IGCT | Hotspot Temp. | 68.74 C. | 68.83 C. |
| | Delta Temp. | 0.23 C. | 0.025 C. |
| | Ave. Temp. | 114.81 C. | 114.81 C. |
| | Max Temp. | 114.94 C. | 114..94 C. |
| Diode | Hotspot Temp. | 48.85 C. | 47.73 C. |
| | Delta Temp. | 0.17 C. | 0.26 C. |
| | Ave. Temp. | 63.65 C. | 61.21 C. |
| | Max Temp. | 63.74 C. | 61.33 C. |
| IGCT | On switching loss | 32.4 W | 44.5 W |
| | Off switching loss | 2606.4 W | 2747.4 W |
| | Cond. loss | 1423.1 W | 1283.7 W |
| | Leakage loss | 43.6 W | 43.6 W |
| | Total loss | 4105.5 W | 4119.2 W |
| Diode | Rev. Recovery Loss | 819.6 W | 670.3 W |
| | Conduction loss | 314.5 W | 303.0 W |
| | Leakage Loss | 130.7 W | 130.7 W |
| | Total Loss | 1264.8 W | 1104.0 W |

TABLE 6

| Parameter | ZCnotch2 | PP1.5 | Units |
|---|---|---|---|
| Vbus actual | 2800 | 2800 | V |
| Current | 1463 | 1373 | A RMS |
| Voltage L-L | 4206 | 4206 | V RMS |
| Power Factor | 0.63 | 0.63 | |
| Output Frequency | 600 | 600 | Hz |
| Switching Frequency | 1200 | 900 | Hz |
| IGCT Conduction Voltage | 1.4 | 1.4 | V |
| IGCT Conduction Res. | 0.0007 | 0.0007 | Ohm |
| IGCT On Switch Loss | 0.324 | 0.324 | Joules at |
| IGCT Off Switch Loss | 4.038 | 4.038 | Joules at |
| IGCT Thermal tau | 0.25 | 0.25 | Second |
| IGCT Thermal res J-hs | 0.0115 | 0.0115 | C./W |
| Diode Conduction Voltage | 1.2 | 1.2 | Volt |
| Diode Conduction Res. | 0.0014 | 0.0014 | Ohm |
| Diode Thermal tau | 0.2 | 0.2 | Second |
| Diode Thermal Res J-hs | 0.01105 | 0.01105 | C./W |
| Water Temperature | 40 | 40 | Degree |
| Thermal Resistance HS-water | 0.007 | 0.007 | C./W |
| Power Flow | From Line | From Line | |
| Power Factor | Lagging | Lagging | |

TABLE 7

| Pulse Pattern | Switching Frequency | Min. THD (current) | Max. Converter MVA |
|---|---|---|---|
| PP1.5 | Fundamental × 1.5 | 2.49% | 6.28 |
| ZCNotch2 | Fundamental × 2 | 2.16% | 6.69 |

Further, another aspect of the invention includes a control scheme for the motor to optimize THD over the full range of motor speed. In such a case, use of the ZCnotch2 switching signal may be employed over the range of speed operation for which it minimizes THD. In an exemplary case for a 6 MW high-speed electric motor, simulations were performed in SABER at each operating point, and the voltage was exported into a spreadsheet to calculate the current harmonics. Waveforms from each simulation were recorded. For operating speeds approximately 10% to about 60%, a pulse-width modulation (PWM) scheme with sine-triangle modulation provided the lowest THD. For operation from about 70% to 90% speed, the ZCnotch2 switching waveform is used, yielding the lowest THD. At 100% speed, synchronous switching with no notches is employed.

FIGS. 9A-9J illustrate the line voltages to neutral voltage ($v_a$-$v_n$) 900 for a phase of three-phase, wye-connected H-bridge converter and the load current (Ia) 910 where the bridge is driving the exemplary high-speed 6 MW motor over the full speed range. under the respective control strategies, described above TABLE 8 summarizes the converter parameters, control strategies and THD performance over the full speed range for the exemplary 6 MW high-speed electric motor.

may form each leg of the semiconductor bridge 1050, for example, but other power semiconductor switches such as integrated-gate commutated thyristors (IGCTs) or metal-oxide semiconductor field-effect transistors (MOSFETs) could be used instead. The type of power semiconductor switch is not important to the analysis. Each bridge includes three legs, 1065, 1075, and 1085. Each phase output, phase A 1060, phase B 1070 and phase C 108080 is connected to the midpoint 1055 of the respective bridge leg. A ZCnotch2 switching waveform may be supplied to the switching control inputs 1045 for the semiconductor switches 1040. The ZCnotch2 switching waveform may also be utilized in other standard semiconductor bridge converters and multi-phase semiconductor H-bridge converters in addition to the three-phase, wye-connected H-bridge converter, previously described.

While only certain features of the invention have been illustrated and described herein, many modifications and changes will occur to those skilled in the art. It is, therefore, to be understood that the appended claims are intended to cover all such modifications and changes as fall within the true spirit of the invention.

TABLE 8

| Speed | Output V L-L | Motor Freq. Hz | Motor Input MW | Fund. Current A RMS | Tot. Current A RMS | Current THD | Modulation |
|---|---|---|---|---|---|---|---|
| 100% | 4160 | 566.67 | 6.205 | 1068 | 1069 | 2.14% | No Notch |
| 90% | 3744 | 510 | 4.523 | 865 | 866 | 4.42% | ZCnotch2 |
| 80% | 3328 | 453.33 | 3.177 | 684 | 685 | 5.52% | ZCnotch2 |
| 70% | 2912 | 396.67 | 2.128 | 523 | 525 | 8.18% | ZCnotch2 |
| 60% | 2496 | 340 | 1.340 | 384 | 398 | 26.8% | 1000 HzPWM |
| 50% | 2080 | 283.33 | 0.776 | 267 | 303 | 54.0% | 1000 HzPWM |
| 40% | 1664 | 226.67 | 0.397 | 171 | 202 | 63.3% | 1000 HzPWM |
| 30% | 1248 | 170 | 0.168 | 96 | 1134 | 97.4% | 1000 HzPWM |
| 20% | 832 | 113.33 | 0.050 | 43 | 191 | 185.9% | 1000 HzPWM |
| 10% | 416 | 56.67 | 0.006 | 11 | 64 | 571.7% | 1000 HzPWM |

Further, while an exemplary 6 MW HSEM has been described in the analysis, application of the ZCnotch2 switching signal to HSEMs with other ratings is considered within the scope of the present invention.

FIG. 10 illustrates an exemplary simplified three-leg, three-phase bridge converter 1000 for driving a three-phase motor load 1095. Each phase of the converter 1000 includes a power source/sink 1020 with a dc power shaping circuit, represented by capacitor 1030. The power source/sink/1020 and dc power shaping circuit, represented by capacitor 1030, establish a dc-link voltage input to the semiconductor switches 1040 of the bridge. As previously described, insulated-gate bipolar transistors (IGBTs) with built-in diodes

The invention claimed is:

1. A control scheme for operating a high-speed electric motor powered from a three-phase wye-connected H-bridge converter with semiconductor switching devices to minimize switching loss and harmonic distortion, the control scheme comprising:
  providing pulse width modulation gating control over a over a partial range of motor speed operation;
  providing zero current switching pattern with two notches positioned in proximity to a zero crossing for load current of the motor for gating control over a partial range of motor speed operation; and
  providing synchronous speed gating control for full-speed motor operation.

* * * * *